United States Patent
Milne

(10) Patent No.: US 10,740,840 B2
(45) Date of Patent: Aug. 11, 2020

(54) MATCH ENGINE TESTING SYSTEM

(71) Applicant: New York Mercantile Exchange, Inc., Chicago, IL (US)

(72) Inventor: Andrew Milne, Maplewood, NJ (US)

(73) Assignee: New York Mercantile Exchange, Inc., New York, NY (US)

(*) Notice: Subject to any disclaimer, the term of this patent is extended or adjusted under 35 U.S.C. 154(b) by 382 days.

(21) Appl. No.: 14/729,848

(22) Filed: Jun. 3, 2015

(65) Prior Publication Data

US 2015/0269677 A1 Sep. 24, 2015

Related U.S. Application Data

(63) Continuation of application No. 14/089,071, filed on Nov. 25, 2013, now abandoned, which is a continuation of application No. 12/032,379, filed on Feb. 15, 2008, now Pat. No. 8,595,119.

(51) Int. Cl.
*G06Q 40/04* (2012.01)
*G06Q 40/06* (2012.01)
*G06F 8/10* (2018.01)
*G06F 8/34* (2018.01)
*G06Q 40/00* (2012.01)

(52) U.S. Cl.
CPC ............... *G06Q 40/04* (2013.01); *G06F 8/10* (2013.01); *G06F 8/34* (2013.01); *G06Q 40/00* (2013.01); *G06Q 40/06* (2013.01)

(58) Field of Classification Search
CPC ........ G06Q 40/00; G06Q 40/04; G06Q 40/06; G06F 8/10; G06F 8/34

USPC .......................................................... 705/37
See application file for complete search history.

(56) References Cited

U.S. PATENT DOCUMENTS

| | | | | |
|---|---|---|---|---|
| 7,039,610 B2* | 5/2006 | Morano | ................. | G06Q 40/00 705/35 |
| 7,216,294 B2* | 5/2007 | Gibbs | ..................... | G06F 40/14 715/235 |
| 7,356,499 B1* | 4/2008 | Amburn | ............... | G06Q 10/087 705/37 |
| 7,685,052 B2* | 3/2010 | Waelbroeck | ........... | G06Q 40/04 705/37 |
| 7,752,110 B1* | 7/2010 | Swearingen | ........... | G06Q 40/00 705/35 |
| 8,578,324 B2* | 11/2013 | Hartman | ................. | G06F 30/00 717/104 |

(Continued)

OTHER PUBLICATIONS

Applix and sybase get bullish on risk analytics offering; leading real-time analytics platform with unique self-service modeling and reporting extends sybase's wall street data management dominance. (Aug. 21, 2006). PR Newswire Retrieved from http://dialog.proquest.com/professional/docview/451119151?ac (Year: 2006).*

*Primary Examiner* — Kito R Robinson
(74) *Attorney, Agent, or Firm* — Lempia Summerfield Katz LLC

(57) ABSTRACT

A symbolic modeling language for trade matching providers techniques to describe the specialized operations of a match engine in a form that can be understood by business analysts and readily translated into program code and test cases by developers and testers. Associated techniques for calculating implied markets and testing can expedite match engine development, testing and maintenance.

7 Claims, 38 Drawing Sheets

(56) References Cited

U.S. PATENT DOCUMENTS

| | | | | |
|---|---|---|---|---|
| 8,694,448 | B2* | 4/2014 | Mandelbaum | H04L 41/082 706/14 |
| 2003/0014351 | A1* | 1/2003 | Neff | G06Q 40/04 705/37 |
| 2003/0028540 | A1* | 2/2003 | Lindberg | G06F 16/958 |
| 2003/0028863 | A1* | 2/2003 | Reichenthal | G06F 30/20 717/135 |
| 2003/0101251 | A1* | 5/2003 | Low | G06F 8/34 709/223 |
| 2003/0233309 | A1* | 12/2003 | Matus | G06Q 40/04 705/37 |
| 2004/0107414 | A1* | 6/2004 | Bronicki | G06F 8/34 717/105 |
| 2004/0153394 | A1* | 8/2004 | West | G06Q 40/00 705/37 |
| 2006/0075303 | A1* | 4/2006 | Ulrich | G06F 11/3672 714/38.14 |
| 2006/0173771 | A1* | 8/2006 | Johnston | G06Q 20/10 705/37 |
| 2006/0236225 | A1* | 10/2006 | Achilles | G06F 40/14 715/205 |
| 2006/0271849 | A1* | 11/2006 | Thormaehlen | G06F 8/10 715/202 |
| 2008/0209389 | A1* | 8/2008 | Baumgartner | G06F 8/43 717/104 |
| 2008/0255892 | A1* | 10/2008 | Orangi | G06Q 10/04 705/7.38 |
| 2009/0018944 | A1* | 1/2009 | De Verdier | G06Q 40/04 705/37 |
| 2009/0070103 | A1* | 3/2009 | Beggelman | G06F 40/20 704/9 |

* cited by examiner

| | Step Name | Description | Expected | Action |
|---|---|---|---|---|
| | Step 1 | Open calendar spread screens for HO & CL | Calendar spread screens are displayed. | |
| | Step 2 | Open Crack spread screen for CL:HO. | Crack screen appears. | |
| | Step 3 | Enter an order to sell 1 HO 1st/2nd mo. Spread @ default. | Order accepted into market. | |
| | Step 4 | Enter an order to sell 1 HO 2nd/3rd month spread @ default | Spread order accepted into market. | |
| | Step 5 | Enter order to Sell 1 HO 3rd/4th mo. spread @ default | Order enters market. | |
| | Step 6 | Enter order to buy 1 CL:HO 1st month at default. | Crack order accepted into market. | |
| | Step 7 | Enter order to Sell 1 CL:HO 4th mo. at default. | Crack order accepted into market (Sell 1 CL). | |
| | Step 8 | Hit the CL spread that has been implied through the chain. | Chain of spreads should trade. | |

FIG. 1

| VIRT | Outright delivery months | | | Strip delivery combinations | | |
|---|---|---|---|---|---|---|
| | F | G | H | VFG | VFGH | VGH |
| 0/∞ | | | | | | |
| HU | 1 | 5 | 9 | 13 | 17 | 21 |
| HO | 2 | 6 | 10 | 14 | 18 | 22 |
| CL | 3 | 7 | 11 | 15 | 19 | 23 |
| 2HU 1HO | 4 | 8 | 12 | 16 | 20 | 24 |

| Symbol | Description |
|---|---|
| + | Add an order to the grid |
| e → | Input order or message that will trigger a state change, e.g. SCS HO→OPEN → represents a Set Contract States message changing the Heating Oil (HO) product to OPEN, which can cause a "leveling" trade. |
| ⇒ | Implies, "leads to", "is followed by", etc. |
| → T | Build a Trades output element |
| → MD | Build a Market Data output element |
| → PLQ | Dispose of an order or remnant of an order by storing it on the Price Level Queue for its contract. |
| ↙ ↘ | There are two alternative subsequent states of which only one will be chosen, depending on the event and precedent state. |
| ↑____ | Processing of this event is complete. Wait for the next event in the current state. |

FIG. 6

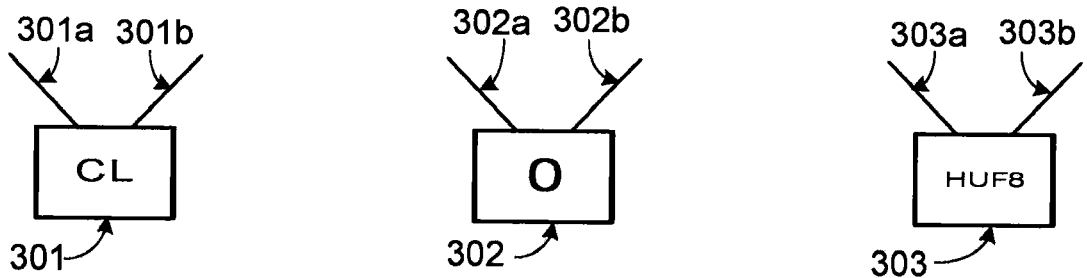

FIG. 7A

| | |
|---|---|
| F | Future |
| S | Spread (calendar spread in the same product) |
| X | Intercommodity or crack spread |
| T | Strip |
| R | Ratio spread, e.g. 3CL:2HU1HO |
| O | Outright (=Future) or Option (=Put or Call) |
| C | Call Option, may be used for calendar spread if options are not required in the model |
| P | Put Option |
| Q | Combination or Composite Product such as a Future + Option strategy |
| h | helper order |
| I, i | "implies" |
| + | "in parallel with", "in addition to" |
| b | buy, when not derivable from the rest of the expression |
| s | sell, when not derivable from the rest of the expression |
| 1,2,3... a,b,c... | subscripts used to identify specific contracts ir chains where a type of order is repeated |

FIG. 7B

① ② ③ etc        Event numbers

MOD        Modify event

CXL        Cancel event

•        Timer event

|     | VIRT | F | G | H | J | K | M |        |
|-----|------|---|---|---|---|---|---|--------|
| HU  |      | 1 | 5 | 9 | 13 | 16 | 19 | CLOSED |
| HO  | 0    | 2 | 6 | 10 | 14 | 17 | 20 | CLOSED |
| CL  |      | 3 | 7 | 11 | 15 | 18 | 21 | OPEN   |
| SC  |      | 4 | 8 | 12 | not tradable | not tradable | not tradable | OPEN |

FIG. 8C

"text"     Administrative event

•
•     Timer events, showing here
•     the occurrence of four clock
•     ticks before creation of a
•     Market Data message.

→ MD

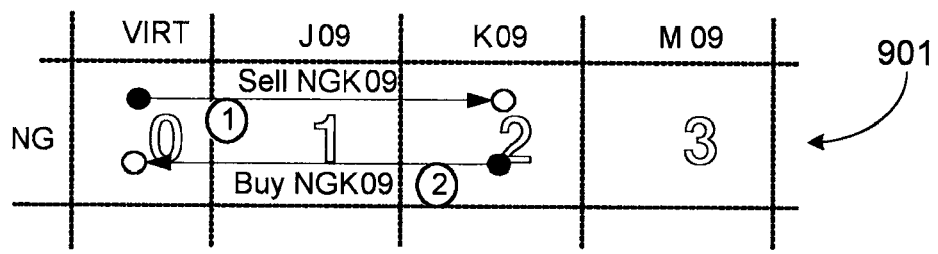
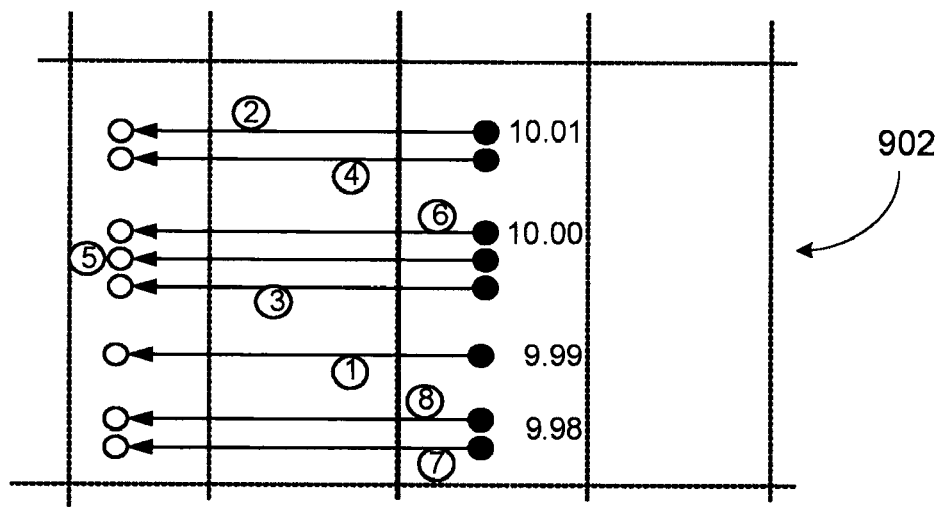
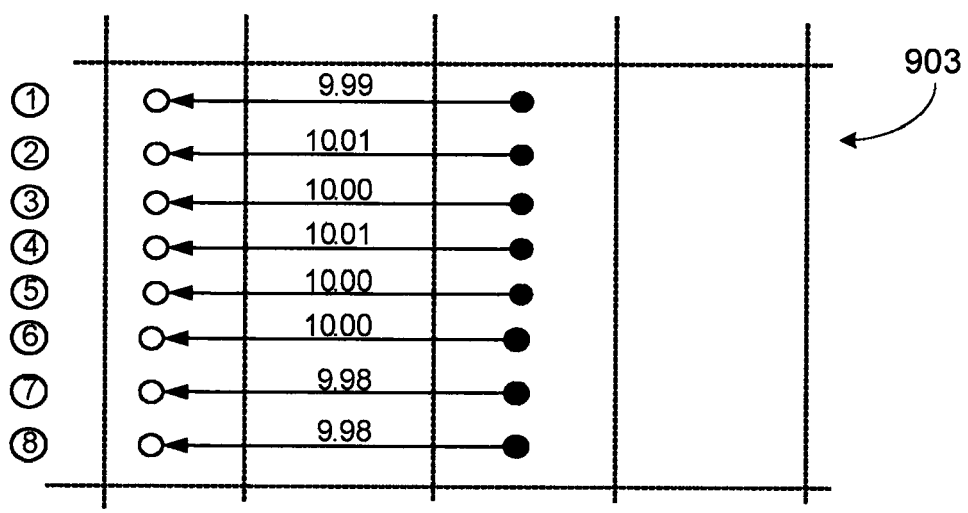
FIG. 11

| | |
|---|---|
| FFIS | an outright future plus an outright future in the same product imply a calendar spread |
| FCIF | an outright future plus a spread in the same product imply a future in a different delivery period. |
| SSIS | two spreads imply a different spread |
| FPCIQ | future plus put plus call imply a composite (a fence) |
| ThFThFThIF | strip plus helper plus future plus strip (again) plus helper plus strip (again) plus helper imply a future in the remaining leg of the strip |
| hF+hF+hFIT | helper plus future *in addition to* helper plus future (in the second leg) *in addition to* helper plus future (in the third leg) imply a (quarterly) strip |
| $S_1S_2S_3S_4S_5IS_6$ | five spreads imply a sixth spread, where a different part of the specification has to refer to specific elements of the chain |

| Policy State 1 "first generation implieds only" ||
|---|---|
| Allowed chains | Description |
| FFIS<br>FSIF<br>SFIF<br>SSIS | Two contracts may be combined to imply a third contract. No other implieds are possible. |

2501

| Policy State 2 "first and second generation implieds only" ||
|---|---|
| Allowed chains | Description |
| FFIS<br>FSIF<br>SFIF<br>SSIS<br>FFSIS<br>SFFIS<br>SSFIF<br>FSSIF<br>SSSIS | Two contracts may be combined to imply a third contract. Three contracts may be combined to imply a fourth contract. No other implieds are possible. |

MATCH ENGINE TESTING SYSTEM

RELATED APPLICATIONS

This application is a continuation of U.S. patent application Ser. No. 14/089,071 entitled "Symbolic Language for Trade Matching," filed Nov. 25, 2013, which is a continuation of U.S. patent application Ser. No. 12/032,379, now U.S. Pat. No. 8,595,119 entitled "Symbolic Language for Trade Matching," filed Feb. 15, 2008, the disclosures of the aforementioned are expressly incorporated herein by reference in their entireties.

TECHNICAL FIELD

This disclosure relates to systems that use a symbolic language for trade matching.

BACKGROUND

The design of reliable high-speed software for a match engine (e.g., one that recognizes implied spread markets) poses a number of problems for a commodities exchange, and in particular to the software architect or program manager responsible for the implementation. Aspects of these problems include the complexity of the market, the speed at which the exchange must operate, and the need to quickly implement reliable electronic trading software.

The complexity of the market arises from, among other things, the large number of potential order combinations. For example, a single commodity with 72 delivery months has 2556 (72*71) potential spread contracts. For even the simplest implied markets where orders in two contracts imply an order in a third, there are 6,530,580 (2556*2555) possible combinations. As the number of contracts involved in the implication gets larger, the number of possible combinations grows exponentially. The problem is aggravated when multiple commodities are linked by intercommodity spreads that can also take part in implication, especially since different commodities can open and close at different times, thereby affecting which orders can take part in implication.

The speed of electronic commodities trading has increased by a factor of about a hundred since 2001. While in 2001 there might have been 5000 lots of Light Crude traded overnight on the New York Mercantile Exchange (NYMEX) electronic trading platform, by 2007, the daily volume could attain 500,000 lots or more. The growth in overall volume is likely to continue, given the ever-increasing demand for energy-related commodities.

During the period from 2001 to the present, many commodities exchanges have become publicly-traded companies subject to increased competition and investor scrutiny. The ability of an exchange to specify, design and test new electronic trading software is crucial in maintaining volume growth and its positive effect on shareholder value. This combination of high complexity, high speed and reduced time to market is coupled with an increased need for reliability. In 2001, electronic trading at NYMEX was an overnight service accounting for less than 10% of the volume traded. Orders were received at a rate of 1-2 per minute and a call-in number was available to assist traders with technical and business issues. By 2007, over 90% of the exchange's volume was traded electronically at an average message rate of over 100 per second. An outage that would have passed unnoticed in 2001 would now affect dozens of traders and millions of dollars in transactions.

These problems are common to modern exchanges, since the majority of their revenue comes from electronic trading and the cost of inaccurate calculations or lost business from system failures can be significant.

SUMMARY

In some implementations, a symbolic modeling language for trade matching provides techniques to describe the specialized operations of a match engine in a form that can be understood by business analysts and readily translated into program code and test cases by developers and testers. Associated techniques for calculating implied markets and testing can expedite match engine development, testing and maintenance.

The details of one or more implementations are set forth in the accompanying drawings and the description below. Other features, objects, and advantages will be apparent from the description and drawings, and from the claims.

BRIEF DESCRIPTION OF DRAWINGS

FIG. 1 illustrates manual testing of trades;
FIGS. 3A-7C illustrate the concrete syntax of one implementation of a MEML;
FIGS. 8A-21 illustrate the abstract syntax of an implementation of a MEML;
FIGS. 23-26 illustrate the semantic mapping of an implementation of a MEML.

DETAILED DESCRIPTION

Figure 2:
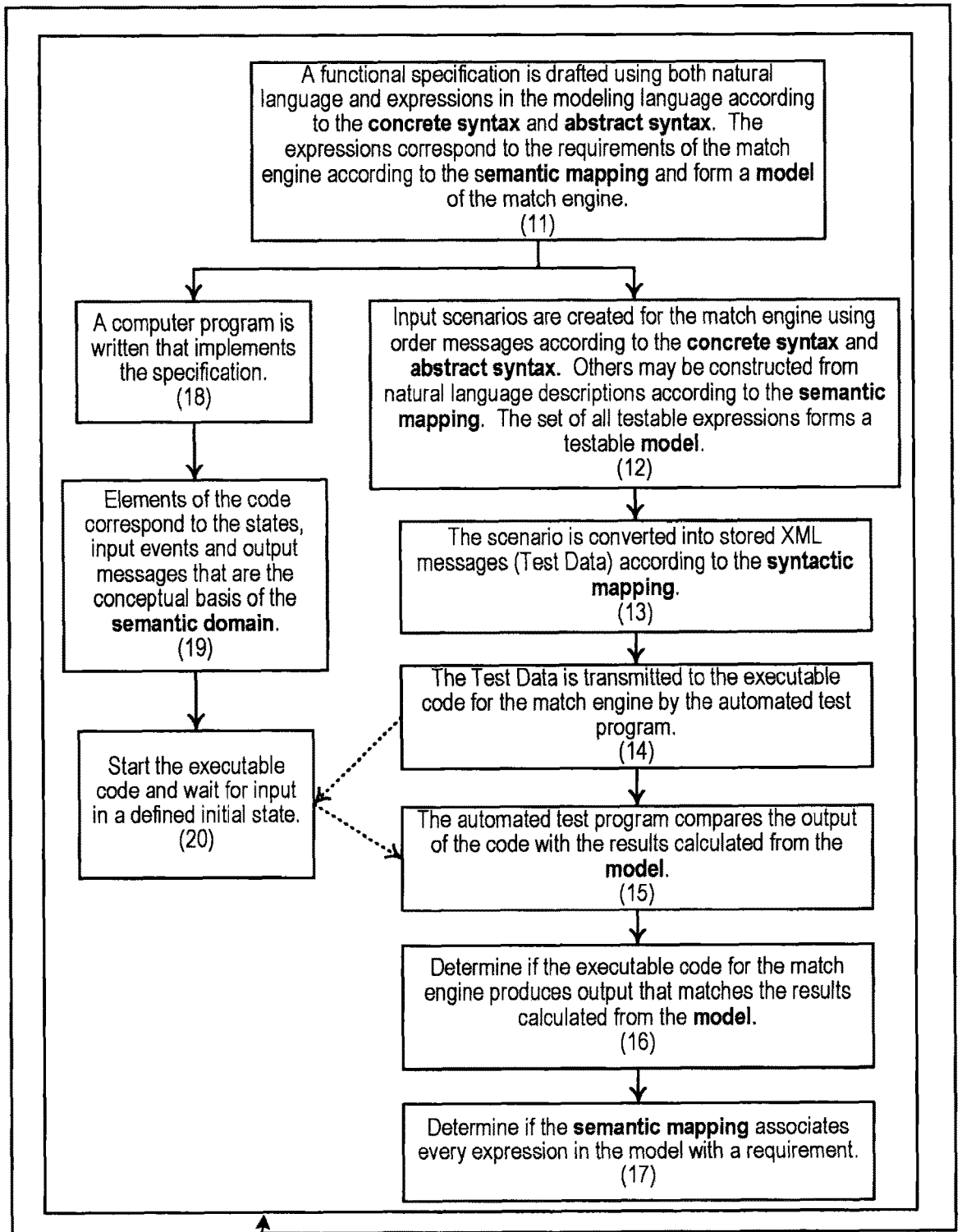
FIG. 2 illustrates an implementation of a methodology for programming and testing a match engine using a Match Engine Modeling Language (MEML)

The following is a detailed description of preferred implementations, as well as some alternative implementations, of a symbolic language for trade matching and related systems and methods.

An example of a technique and match engine for identifying implied markets (and the possible trades in such markets) can be found in commonly-assigned U.S. Pat. No. 7,039,610, which is hereby incorporated herein by reference.
General Overview In some implementations, a symbolic modeling language for trade matching (a Match Engine Modeling Language) provides techniques to describe the specialized operations of a match engine in a form that can be understood by business analysts and readily translated into program code and test cases by developers and testers. Associated techniques for calculating implied markets and testing can expedite match engine development, testing and maintenance.
Modeling Language In some implementations, the Match Engine Modeling Language (MEML) is a Domain Specific Visual Modeling Language (DSVL). The language applies specifically to the trade matching system or "match engine" component of the trading network. The use of a DSVL is preferred in some cases because it can be more easily adapted for use with current and emerging software development tools. As a constructed language, DSVLs are typically described as including: (1) syntax, e.g., the formal relation of signs to one another; (2) semantics, e.g., the relation of signs to the real-world entities that they represent and (3) pragmatics, e.g., the relation of signs to, for example, human interpreters.

Generally speaking, domain specific modeling languages are limited to a particular semantic domain. If the domain is sufficiently limited and the language sufficiently well-defined, then many useful tasks can be defined algorithmically and executed by machines instead of human beings. A domain specific visual modeling language is a particular implementation of this concept.

The symbolic language for trade matching (i.e., the MEML) can be implemented to comprise the five commonly-understood elements of a DSVL: (1) a concrete syntax consisting of visual symbols; (2) an abstract syntax that sets rules on how the symbols can be combined to form meaningful expressions; (3) syntactic mapping through which expressions in the MEML are associated with expressions in another language with a formal syntax, e.g., an XML message or a computer programming language; (4) a semantic domain, e.g., the internal operations of a match engine in a trading network; and (5) semantic mapping that associates visual expressions and their transformations with states and events in the trading system. The following disclosure describes each of these elements, as they apply to an implementation of the symbolic language for trade matching.

In one aspect, the symbolic language for trade matching makes it possible to represent the computational requirements of the trading system in a form suitable for mathematical analysis. In some cases, existing mathematical theories and/or widely known algorithms may provide solutions that are reliable and low in cost. In other cases, the visual representation will yield well-posed problems that can be solved by developers or analysts without a specialized knowledge of trading and possibly with only basic mathematical knowledge. Regardless, the visual representation aspect of the language allows the analyst to see and specify the correct answer for testing, which is desirable regardless of how the solution was developed.

Testing and Programming a Match Engine

Advantages of electronic trading systems and the techniques for identifying and creating implied markets include, e.g., (1) deeper markets and (2) greater market efficiency. However, given the complexity of the market and the immense number of possible actual and implied outright, spread and strip orders, the electronic system must be able to reliably identify and execute those actual and implied trades. Thus, it is desirable that the system be (1) programmed in a manner that anticipates the immense number of possible trades and (2) tested to ensure that those possible trades execute as they should.

Generally, the testing of an electronic trading system is a manual process based on written scripts and manual entry of data into a graphical user interface. An example screen shot of such testing is shown in FIG. 1. Users (e.g., analysts) identify trading scenarios, and create "scripts" that detail each step of the scenario. Each step may include, for example, one or more orders. In the example shown in FIG. 1, the user is attempting to test the scenario that that several heating oil ("HO") spreads, i.e., steps 3-5, in combination with two inter-commodity spreads for crude oil ("CL") and heating oil, i.e., steps 6-7, imply a crude oil spread.

These scripts may be written by test managers working from spreadsheets or written notes prepared by business analysts. The results would be confirmed manually by testers. These techniques are time-consuming and prone to clerical errors. Given these tedious techniques, trade set matching systems are often limited to simple two-order implieds. Since it is preferred that a trading system be tested thoroughly, this is not an efficient approach for testing a large number of trading scenarios. Moreover, manual scripts cannot cope with advanced optimization techniques where orders are processed in batches and market data is sometimes deferred until a significant change in order state has occurred.

Generally, programming a match engine is a similarly tedious process. For each type of trading scenario envisioned by an analyst, a script is generated. Then, code is created that implements the script. Given the large number of possible trading scenarios, programming a match engine is a lengthy, costly process. Maintenance of even simple matching software can be difficult because the underlying concepts cannot be documented clearly.

A symbolic language for trade matching can be implemented to address the need of the exchange to implement and maintain high-speed, high-reliability software in a shorter time and with fewer resources. Such a symbolic language may increase the productivity of specialized analysts and developers through a visual modeling language and related tools for automated program and test data generation. The modeling language and automated test tool make it possible to design, implement and test trade set matching systems for a much broader class of order combinations. An exchange or related business can deploy superior trade set matching software in a shorter time and with fewer resources.

Associated with the MEML is an automated test tool that can translate visual expressions into inputs that can be transmitted to a match engine. The tool calculates the required output of the match engine and can compare the output from an actual system with a calculated reference. In some applications, the automated test tool is mainly used to verify that newer versions of a match engine continue to meet the original specification. Also, visual expressions of the symbolic language may be on a computer screen and automatically translated into sequences of messages for transmission to a specific match engine.

The MEML includes techniques for calculating implied markets for several order types. In principle, a computer program that calculates the expected output of the match engine for testing purposes performs the same calculations as the match engine. Thus, visual expressions in the MEML could be assembled into a complete specification of a match engine. The MEML can be used to create a testable specification of the match engine and the automated test tool is used to confirm that the match engine meets this specification. The test code, derived from the MEML testable specification, can be used as a starting point for a trade set matching system and the automated test system can be used to verify that refinements made by human programmers continue to meet the original specification.

Some Implementations of a Symbolic Language for Trade Matching and Related Systems/Processes The symbolic language and related system/processes can be applied to any trading system where an incoming order can be matched with a combination of two or more orders previously received and stored, For example, implementations are applicable to trading systems where combinations of orders are possible, including outright future orders, spread orders with two or more legs and strip orders, regardless of whether these combinations are traded in practice. Generally speaking, the symbolic language and related system/processes relate primarily to the part of the trading system known as the match engine.

An implementation can consist of three related parts:
(1) a visual domain specific modeling language (e.g., the MEML) for specifying the operations to be performed by the match engine;
(2) a technique for calculating implied markets for order combinations that can be expressed in the MEML; and
(3) for any specific match engine, an automated test tool that transforms expressions in the MEML into inputs and outputs (e.g., "test data") for testing a specific trade set matching system.

In some implementations, the basic visual elements of the MEML have been chosen to facilitate their use in illustrations that assist business analysts, software architects, developers and others in describing and understanding how other components of the trading network interact with the match engine. For example, the reception of an order can be shown in an animation as the movement of an order symbol onto a grid showing previously received orders. This provides an exact specification of the end state of the match engine along with an illustration of how other trading network components might drive the match engine to that state.

An implementation can be characterized by the intuitiveness of some elements in its modeling language, which can be based on simple order types for which the calculation of implied markets is already known. An implementation can provide a visual representation so that users can translate the specialized procedures for more complex order types into programs for many different trading systems.

Implementations of a MEML

In one implementation, the MEML comprises the five commonly-understood elements of a Domain Specific Modeling Language (i.e., it is a "five-tuple"): (1) a concrete syntax, which can consist of visual symbols related to the internal operations of a match engine; (2) an abstract syntax, which can set rules on how the symbols can be manipulated; (3) syntactic mapping, through which an event is associated with the transformation of one visual expression into another; (4) a semantic domain, which can consist of order matching in a match engine; and (5) semantic mapping, which associates MEML expressions with the real-world entities they represent, i.e., the states and events in the match engine being modeled.

FIG. 2 illustrates how these five elements in an implementation of the MEML work together in the context of programming and/or testing a match engine. The large block 10 represents the semantic domain. The semantic domain 10 encompasses all match engines that can ultimately be described in terms of input events, internal states, and outputs (e.g., as a Turing Machine). Electronic computing systems may in theory be described as Turing Machines and the Turing Machine may itself be described as a Finite State Machine. The semantic domain of MEML therefore can encompass any electronic trading system. The semantic domain 10 encompasses blocks 11-21 because it represents the context in which an implementation of the MEML operates.

Blocks 11-20 are encompassed by block 21. Block 21 represents the requirements for a specific match engine within the semantic domain 10. The requirements 21 can be written by a business analyst and generally define the properties and behavior of a specific match engine. The requirements can be expressed in natural language (e.g., English) with numerical examples. For example, a business analyst might write requirements for a match engine that include the ability to detect and trade implied markets.

Based on the requirements 21, a functional specification is drafted (11). The functional specification can be written in both natural language and expressions in the modeling language (i.e., the MEML). The expressions in the MEML are constructed according to the concrete syntax and the abstract syntax. The expressions correspond to the requirements of the match engine 21 according to the semantic mapping. The expressions form a model (which may be complete or incomplete) of the desired match engine.

The process then breaks into two separate legs. On one leg, a computer program is written (18) that implements the specification of block 11. Aspects of the executable code correspond to the states, input events and output messages that are the conceptual basis of the semantic domain 10 (see block 19). Put another way, an object of the executable code is to cause the finite state machine to behave in a manner consistent with the semantic domain 10 and the requirements of the match engine (21).

After the code is written, it is started and waits for input in a defined initial state (20). The code responds to input messages in accordance with the specification of block 11. At this point, generally speaking, the code is being run for test purposes as it may be preliminary and not fully debugged. In some other implementations (e.g., non-critical applications), the code can be considered complete at this point.

For testing purposes, input scenarios are created for the match engine using order messages (e.g., add, modify or cancel) according to the concrete syntax and the abstract syntax (12). Additional scenarios can be created from natural language expressions according to the semantic mapping (12) or derived formally from the model of block 11. In contemporary software development, it is common for work on parts of the functional specification to begin as soon as their governing requirements are known. The advantage of starting early typically outweighs the cost of revising the model when the business requirements are completed and reviewed in their entirety. It is also common for the analyst to describe a representative scenario which must be translated into model expressions covering every possible variation. A simple derivation of this kind is to translate all the buys into sells and vice versa. The set of testable expressions made by, e.g., a test author, forms a testable model of the match engine.

The scenarios of block 12 are converted into XML messages (e.g., "test data") according to the syntactic mapping (13). An algorithm can be used to produce the expected results of the match engine so that a separate syntactic mapping associates the visual expression of the MEML with executable code in the in the automated test program. This allows results to be calculated based on the model of the match engine.

The test data is transmitted to the executable code for the match engine by the automated test program (14). The executable code being tested is that which is written in block 18 and started in block 20. The automated test program compares the output of the code with the results calculated from the model (15).

It is then determined whether the executable code for the match engine produces output that matches the results calculated from the model (16). If it does, the executable code implements the model. If it does not, the executable code does not implement the model and is revised. Next, it is determined if the semantic mapping associates every expression in the model with a requirement of the specification set forth in block 21 (17). If the executable code implements the model and the semantic mapping associates every expression in the model with the requirements, the code (of block 18) meets the requirements. Code that meets the requirements can be considered ready for use as a match engine. Each element of the MEML will be discussed in detail.

Concrete Syntax

FIGS. 3A-7C illustrate the concrete syntax of one implementation of a MEML. Generally speaking, the concrete syntax includes visual symbols related to the internal operations of a match engine. A user who is, for example, testing trades communicates with the match engine by using symbols that are part of the concrete syntax. The following is a discussion of several aspects of the concrete syntax.

While one implementation of the concrete syntax is illustrated, many other implementations and variations are possible because the appearance of a visual element can vary substantially. Some variations may pertain to not requiring strict adherence to the formats illustrated. For example, decorations may be repositioned for clarity; lines and arrows may be drawn with different lengths, thicknesses, colors, directions, curvatures or other basic properties to make an expression easier to comprehend; and repeated or default values may be left out. Some variations may use entirely different symbology for illustrating trades.

Figure 3A:
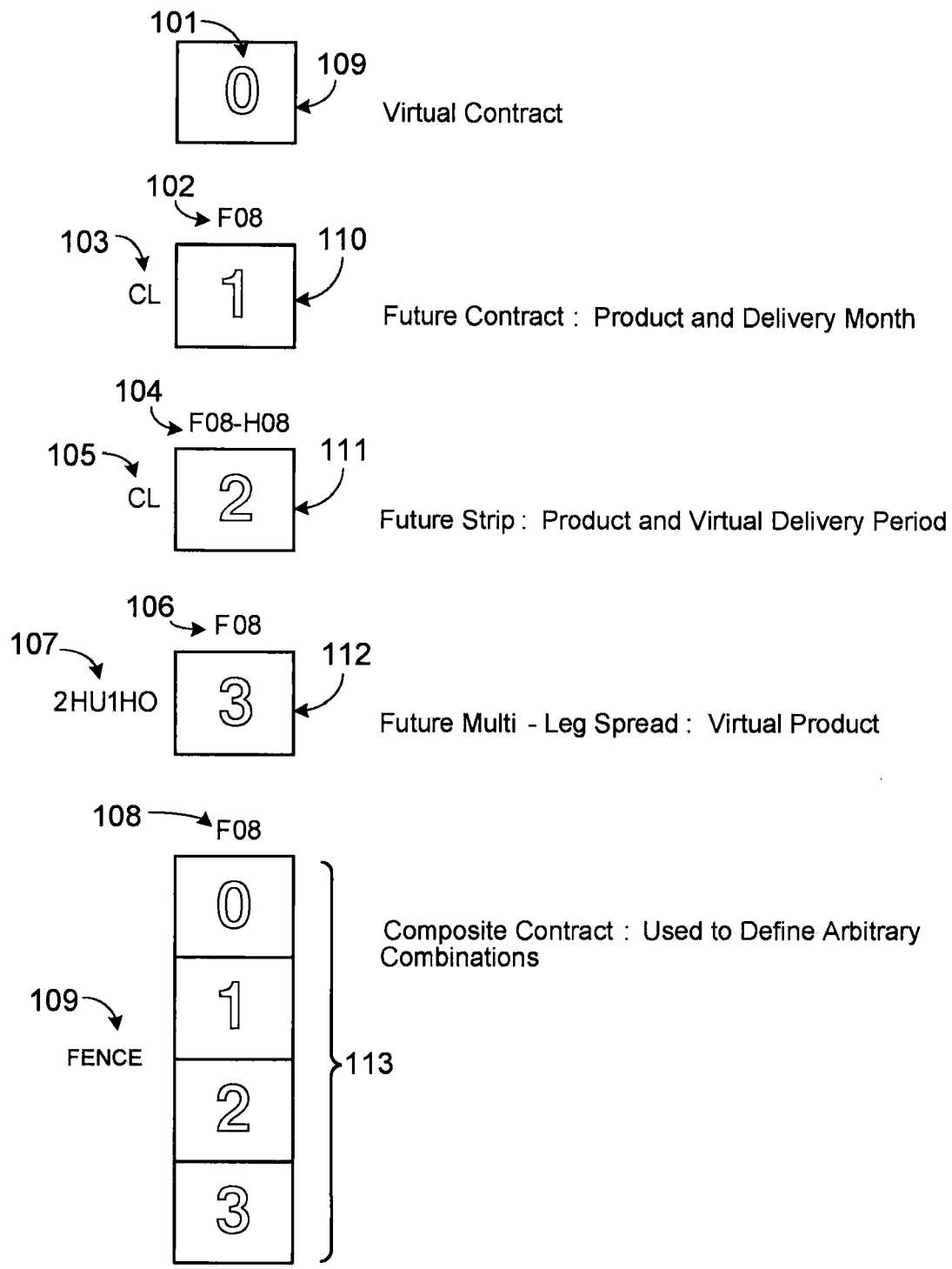
Figures 3B, 4:
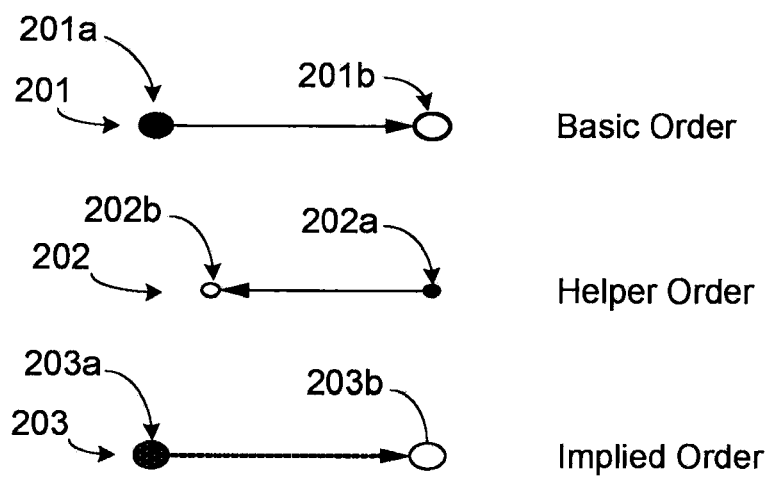

FIG. 3A illustrates examples of grid elements. Generally speaking, trades in the MEML are represented on a grid that comprises grid elements. The grid elements are combined to form a worksheet onto which orders can be placed (e.g., via electronic data entry or handwritten) in sequence. The grid is discussed in more detail in connection with the abstract syntax. For context, an example of a grid is shown in FIG. 3B. Each numbered rectangle (0 to 24) corresponds to a grid element. Generally speaking, a grid element is the intersection of a product and a delivery month. The exception is a grid element associated with a virtual contract, discussed below.

In this implementation, the MEML represents every order as a spread between two contracts, which may be real or "virtual." Every order buys one contract and sells another. In the discussion of semantic mapping, it will be seen that this technique is capable of representing every possible order that can take part in an implied market of any kind.

FIG. 3A illustrates a variety of grid elements. Item 109 represents a "virtual" contract grid element. The concept of virtual contracts is discussed in greater detail in the section entitled "Abstract Syntax," but generally, the virtual contract grid element 109 enables all orders (including outrights) to be represented as spreads. Thus, an outright order for September heating oil is represented as a spread between a virtual contract grid element (e.g., 109) and the grid element associated with September heating oil. Like all grid elements, the virtual grid element 109 has a number (101) that uniquely identifies its location on the overall grid. Unlike other grid elements, however, a virtual contract grid element does not have a delivery month (e.g., items 102, 104, 106 and 108) or a product (e.g., 103, 105, 107 and 109) associated with it. In some implementations, the virtual grid element (109) is always assigned number "0".

FIG. 3A also illustrates a conventional future contract grid element 10. The associated delivery month 102 (January 2008) and product 103 (crude oil) are identified. Item 111 represents a future strip grid element which has a virtual delivery period (FGH). Generally speaking, a future strip is the simultaneous purchase (or sale) of futures positions in consecutive months. The virtual delivery period is the months of the strip. The average of the prices for the futures contracts bought (or sold) is the price of the contract. A three-month strip, for example, consists of an equal number of futures contracts for each of three consecutive contract months. The delivery months 104 indicate that this strip is a three-month strip from January to March. The product 105 is again crude oil.

Virtual products (not to be confused with virtual contracts) also may be represented by grid elements. A virtual product, generally speaking, is the combination of multiple contracts that are either all bought or all sold together in combination with another contract. A virtual product makes it possible to define ratio spreads such as 3CL:2HU1HO, where 3 lots of CL are bought, 2 lots of HU are sold and 1 lot of HO is sold. The 2HU1HO virtual product combines the two products on the sell end of the spread. This is shown in grid element 112. The delivery date (106) is January.

There are combinations of contracts for which a virtual product is not convenient. These combinations are defined with a more general element called the "composite contract." For instance, four grid elements 113 are associated with a "fence" order. The product is identified as a fence (109) in a similar manner as products may be identified as, e.g., crude oil (103). Generally speaking, a fence entails buying a futures contract and hedging it with the purchase of an out-of-the-money put and the sale of an out-of-the-money call. The premium received from the call sale is used to subsidize the purchase of the put. Item 109 is only one example of a fence. The fence element is shown having four basic grid elements 113 because these are used to place all of the "helper orders" required to connect the basic orders for implication. Other strategies that require different numbers and types of contact will require different numbers of rectangles to express the implication relationships correctly. Helper orders are discussed in more detail in connection with FIGS. 4, 9, 12 and 13.

Any type of contract can be identified with the appropriate grid element(s).

While the grid elements are associated with particular contracts, to model and test trades, a symbology for orders is needed. FIG. 4 illustrates examples of order elements (201-203) that are utilized in combination with the grid elements.

Order element 201 is a basic order element. Solid circle 201a represents the buy end of the element whereas the empty circle 201b represents the sell end of the element. Thus, when the order element is used in conjunction with the grid elements, the solid circle 201a is placed on the grid element associated with the security being bought and the empty circle 201b is placed on the grid element associated with the security being sold. In an outright purchase, the sell end of the element (201b) is placed on a virtual contract element (e.g., 109). In an outright sell, the purchase end of the element (201a) is placed on a virtual contract element (e.g., 109). A helper order 202, which is a constituent order for a contract that has multiple legs (e.g., each order for the crude, heating oil and gasoline contracts of a crack spread), follows a similar symbology to that of the basic order 201 (e.g., solid circle 202a is the buy end and empty circle 202b the sell end), but is smaller in size. Helper orders express the relationships between contracts in a combination product. They have zero price, infinitely early time and infinite volume. They have the unique property that all the helper orders associated with a combination must be present in an implied order that contains the combination as a component.

Order element 203 represents an implied order. Shaded end 203a represents the buy end whereas the empty end 203b represents the buy end. Implied orders, unlike basic or "real" orders, are generated by the trading system on the behalf of traders who have entered basic orders. Implied orders are generated to deepen the market and to provide orders in contracts where no trader has entered an actual order. In order to do this, the trading system examines the basic orders and the helper orders entered into the system and derives orders, which are implicit in the combination of specific basic and helper orders. An implied order may be formed by any combination of orders where the buy ends and the sell ends can be connected to form a chain. For example, a sell outright can connect with a buy spread from the outright month to a second month to imply a sell outright in the second month. A trader entering a buy outright in the second month will trade with the implied order. This implied trade is executed as two related real trades: the buy outright with the sell leg of the spread and the buy leg of the spread with the sell outright.

In addition to indicating whether a contract associated with a grid element is being bought or sold, order elements may represent other order attributes either visually or through symbolic decoration. For example, volume may be represented by the thickness of a line and ownership by color. In some cases it will be more convenient to represent these attributes with numerals, letters or other symbols placed in a visual relationship with the order element. These additions to the order elements are referred to generally as "decorations" (see, e.g., FIGS. 10A and 10B). In some implementations, the order decorations (for price, quantity, order number, etc.) correspond to attribute values in XML messages that a test program can transmit to a match engine. A match engine can be programmed in a similar manner, e.g., to recognize the XML associated with the decorations.

In some implementations related to testing a match engine, grid elements (e.g., of FIG. 3A) are displayed on the screen of a test developer's computer workstation. A pointing device (e.g., a mouse) is used to indicate the end points of orders, which are then drawn and decorated with default values which can then be changed using the features commonly associated with a graphical user interface (GUI). For example, selecting a price decoration and moving the mouse-wheel alters the price. In such an implementation, clicking an on-screen button triggers the automatic creation of XML messages to be stored in a file for later transmission by a test program. The visual elements of the MEML can be rendered in the shapes and colors available in the GUI.

Figure 5:
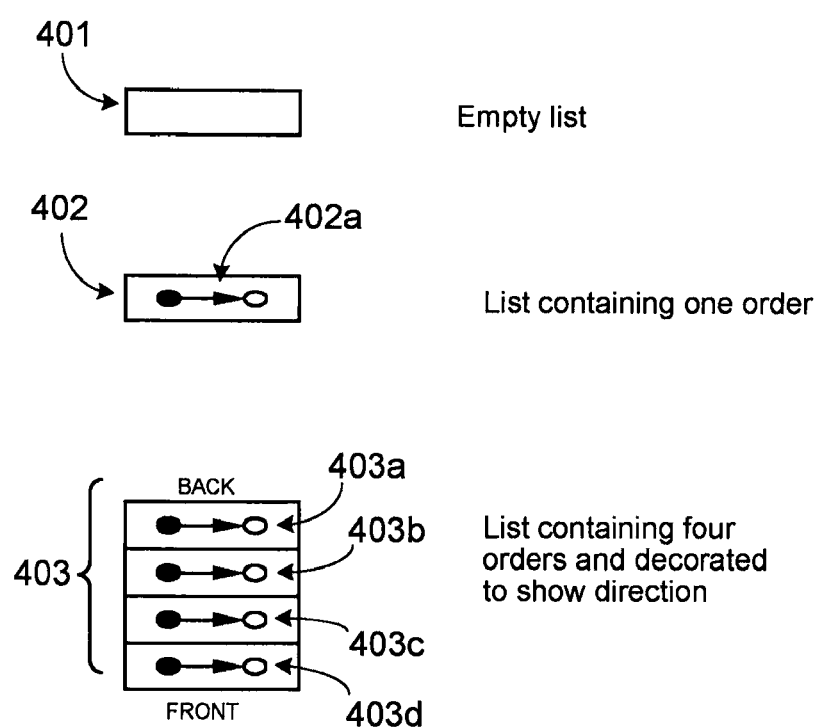

From a temporal perspective, orders in a match engine fall generally into two classes: (1) pre-existing orders, i.e., orders that are "on the book" and (2) incoming orders that are not yet "on the book." The concrete syntax can express incoming orders in the form of a list, as shown in FIG. 5. List 401 is an empty list whereas list 402 comprises one order 402a. List 403 comprises four orders 403a-403d, and includes decoration to indicate the first order in the list ("Front") and the last ("Back"). An analyst can enter orders in list format as shown, including essential information such as product and delivery month. Alternatively, an analyst may enter orders directly on the grid. The list is included in MEML because it corresponds directly to the data structures available in most programming languages. Coding is faster and less error-prone when requirements are expressed in terms familiar to the programmer.

An analyst may need to express more than the entry of the order to fully model and/or test a match engine. Accordingly, the concrete syntax can include symbology for additional functionality, such as "builder and flow elements." For example, the table of FIG. 6 illustrates examples of builder and flow elements within the concrete syntax.

The "builder elements" are associated with the creation of output messages by the Match Engine. A specification expressed in MEML does not depend on either the formats of the output messages or on the specific classes developed by the programmer to create them. However, the "builder design pattern" is a commonly-known programming technique for this type of operation, so the symbols .fwdarw.T and .fwdarw.MD are referred to as builder elements in the expectation that a call to a method of a builder class will be used to output the trade data or market data accumulated at the point in the scenario where they appear.

The "flow elements" are used to express the sequence of operations in a scenario. FIG. 6 shows special symbols for message reception, adding an order to a grid and other operations specific to order matching. General expressions of "one state of affairs leading to another" are shown with the same lines and arrowheads that have appeared in human pictures since the invention of the arrow and the blackened stick for writing on the walls of caves.

Some implementations of the MEML concrete syntax are extensible. For example, the set of builder and flow elements shown in FIG. 6 can be extended with commonly-known symbols (e.g., the ellipsis " . . . " to indicate repetition) or with special symbols to link a MEML representation with a different form of representation.

Another aspect of the concrete syntax is the manner of illustrating to a user—off the grid—the behavior of the grid elements and order elements. Each chain element, illustrated in FIG. 7A, is associated with a particular grid element. For example, chain element 301 is associated with a crude oil (CL) contract having a particular delivery month. As discussed in connection with FIG. 3A, each such contract has a unique grid element. In FIG. 7A, chain element 302 is associated with a virtual contract and chain element 303 is associated with a futures contract for unleaded gasoline (HU) in January 2008 (F8). Each chain element 301-303 has two nodes (301a, 301b; 302a, 302b; 303a, 303b) associated with either buying or selling the associated contract. For example, connecting the buy node 301b of the CL chain element 301 to the sell node 302a of the virtual contract chain element 302 indicates the outright purchase of the CL contract associated with chain element 301. Whether a particular node is a buy or sell node can vary to accommodate illustration of the trade. Chains are used in the modeling language to express the rules for calculating trade prices. Unlike grids and order elements, which can also be used to express the input to the match engine in a trading scenario used for testing, chains are used only to specify the match engine's internal operations.

Chain elements may include decorations that replicate information from their associated grid elements and order elements. This is a convenience for the user of the modeling language that can be provided automatically in some implementations.

Every chain element has an associated contract type, which is represented by one of the textual elements shown in FIG. 7B. Every chain is an instance of an implication pattern expressed by a sequence of textual chain elements. For example, a chain consisting of an buy outright future followed by a sell calendar spread is an instance of the FSiFb pattern. These pattern names are used descriptively, e.g. to label diagrams or test cases. They are also used functionally in MEML to express an implication policy that the match engine must follow, as discussed later. Examples of textual elements and their meanings are illustrated in FIGS. 7B and 7C.

FIG. 7B shows some additional elements that can be used to express events other than the addition of a new order. These include modify and cancel (which require input to the match engine) as well as the "timer event", which is generated inside the match engine but expressed in a way that preserves the Finite State Machine metamodel.

While the foregoing discussion was directed to a particular symbology for a concrete syntax, it also may incorporate the variety of modeling languages and general visual representations for describing computer systems. The exact boundaries of the match engine with respect to its surrounding trading network will vary from one trading network to another. A specific match engine may include general computing functions that can be expressed with well-known elements from flowcharts, state transition diagrams, class diagrams, and the like.

Abstract Syntax

The abstract syntax of an implementation of the MEML is illustrated in FIGS. 8A through 21. The abstract syntax specifies how the visual elements in the concrete syntax may be combined into expressions. It consists of rules for, e.g., (1) combining grid elements into grids; (2) combining basic orders with helper orders; (3) placing orders on grids; (4) placing an implied order on a grid to represent the discovery of a sequence of orders that can be combined; (5) moving a sequence of orders from a grid to a chain; (6) placing decorators, builder elements, flow elements and other details and (7) expression of an implication policy with chain descriptors.

Later, it will be shown that the placing of an order element on a grid corresponds to the entry of a new order into the match engine. This makes it possible to use the grid as a graphical user interface, e.g., for a testing system. Other expressions in MEML correspond to internal operations of the match engine and may not have equivalents in the testing system interface.

The MEML represents every order as a spread between two contracts which may be real or virtual. Every tradable contract corresponds to a pair of positions on a grid. Outrights have the virtual contract as one member of the pair, so that an outright order reduces to a single real contract to be bought or sold.

In this implementation, the simplest possible grid consists of a virtual contract and a single real contract, which may be an outright future, an option on a future, or any other type of contract. On the simplest possible grid there is only one pair of contracts and therefore no possibility of implication.

Figures 8A, 8B:
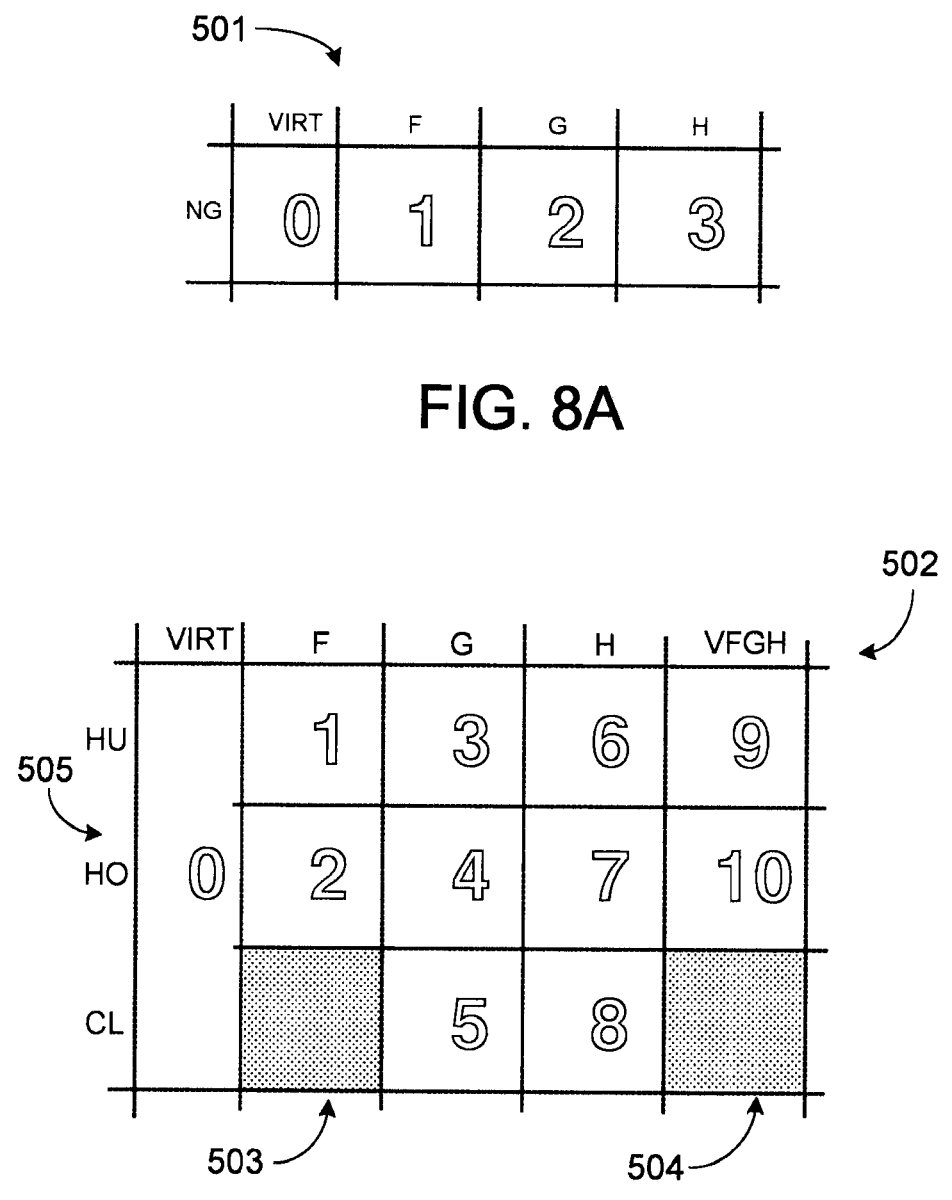

In general, grid elements for real and virtual contracts can be combined in a rectilinear grid (e.g., item 501 of FIG. 8A or item 502 of FIG. 8B). Although these may be resized and positioned arbitrarily on a drawing surface, the following rules of syntax are typically applied in the illustrated implementations: (1) virtual contract zero is placed on the left hand side; (2) for outright and spread contracts specified by product and delivery period, the products are placed in a vertical column to the right of virtual contract zero and the delivery periods (e.g., months) are extended to the right; (3) for strip contracts (where the outright legs are either all buys or all sells), virtual delivery periods are placed to the right of the real delivery periods; (4) for multi-leg spreads (where if one outright leg is a buy the other legs are all outright sells and vice versa), the virtual products are placed below the real products and (5) for composite contracts, the grid elements may be grouped in any visually convenient manner (e.g., a fence is associated with the delivery period of the future, so a fence grid can be constructed by placing fence grid elements side-by-side for the desired number of delivery periods).

FIG. 8A illustrates a simple grid 501 with one product, NG (natural gas), and three real delivery periods: F (January), G (February) and H (March). In some implementations, the delivery period also may indicate the year, e.g., F08 (January 2008). The leftmost column is associated with the virtual contract. Each grid element has a unique number. In this case, 0 is associated with the virtual contract and 1, 2 and 3 are associated with NG delivery months.

FIG. 8B illustrates a somewhat more elaborate grid 502. The grid 502 lists three products on its leftmost column, namely, unleaded gasoline (HU), heating oil (HO) and crude oil (CL). Again, the virtual contract grid element 505 is numbered 0. Three real delivery months are listed on the uppermost row, namely, F, G and H. Also shown is a virtual delivery period (VFGH), corresponding to the months of a first quarter strip. For purposes of this illustration, there is no January CL contract. Accordingly, grid elements 503 and 504 are shaded and unnumbered to illustrate that no contract is associated with grid elements 503 and 504. An order element may not be placed in grid elements 503 or 504. Again, each grid element has a unique number associated with it.

FIG. 8C illustrates how a visual grouping of grid elements facilitates representing contract states. An exchange will typically open and close all the contracts in a specific product at the same time, but may have some products open for trading when others are closed. The alignment of grid elements by product, makes it possible to express certain rules of implication visually. In other words, by placing products in a single row, it is possible to express a business constraint as a visual constraint, e.g., all elements in the same row are marked identically. Here, the contracts that are closed for trading are shown with a line struck through their corresponding grid element. Contracts that are not tradable (e.g., no J, K, or M SC contract exists) are so indicated ("not tradable"). This technique for representing the state of the contract (open, closed, etc.) allows another important business constraint to be expressed visually. If a contract is closed, then it is not possible to create an implied chain that passes through this grid element. For example, if the outright contracts in CL are closed for trading, then the match engine should not calculate any implied orders that have CL as a leg, e.g., an HU:CL spread and a CL:HO spread implying a HU:HO spread. The heads and tails of order elements cannot be placed on grid elements that have been marked as closed.

When all the grids required to model a specific trading system have been assembled, the nodes may be numbered. The relation of node numbers to products and delivery months is referred to as a node map and is part of the syntactic mapping that relates grid elements to attributes in XML messages or other entities used by, e.g., the automated test tool.

Figure 9:
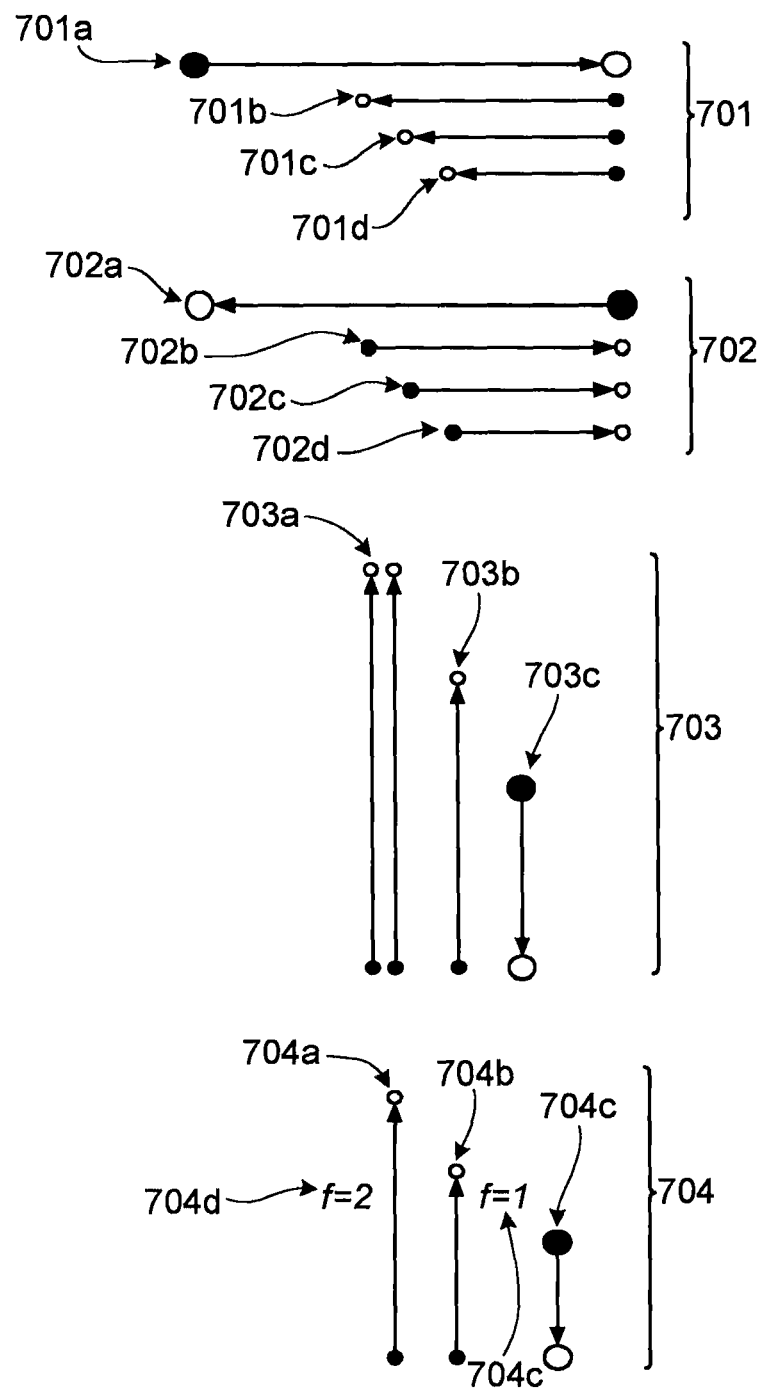

Basic orders may be combined with helper orders as shown in FIG. 9. For clarity, grids are not shown. A basic order consists of buy parts and sell parts represented by solid circles and empty circles respectively. The buy circles are placed on the grid elements corresponding to the buy contracts and the sell circles are placed on the grid elements corresponding to the sell contracts. If the basic order has helper orders, the buy parts or sell parts of the helpers are placed according to the same rules. Order combination 701 illustrates a primary buy order 701*a* for a quarterly strip. Helper orders 701*b*-701*d* are outright buys of the constituents of the strip, e.g., F, G and H crude oil.

Order combination 702 illustrates a primary sell order 702*a* for a quarterly strip. Helper orders 702*b*-702*d* are outright sales of the constituents of the strip, e.g., F, G and H crude oil.

Combination orders 703 and 704 illustrate the same 3:2:1 ratio spread in slightly different ways. Unlike the strip, where the volume in all of the legs is the same, the ratio spread buys 3 lots of CL and sells 2 lots of HU and one lot of HO. The requirement to sell 2 lots of HU for every lot of HO can be shown with two helper orders side by side as in 703*a* or with leg factors 704*c* and 704*d*. When the orders are shown without leg factors, the calculation of the price for the ratio spread is similar to the calculation for the strip, i.e. all of the helpers participate equally. When leg factors are used the price must be calculated as a weighted average.

Figure 10A:
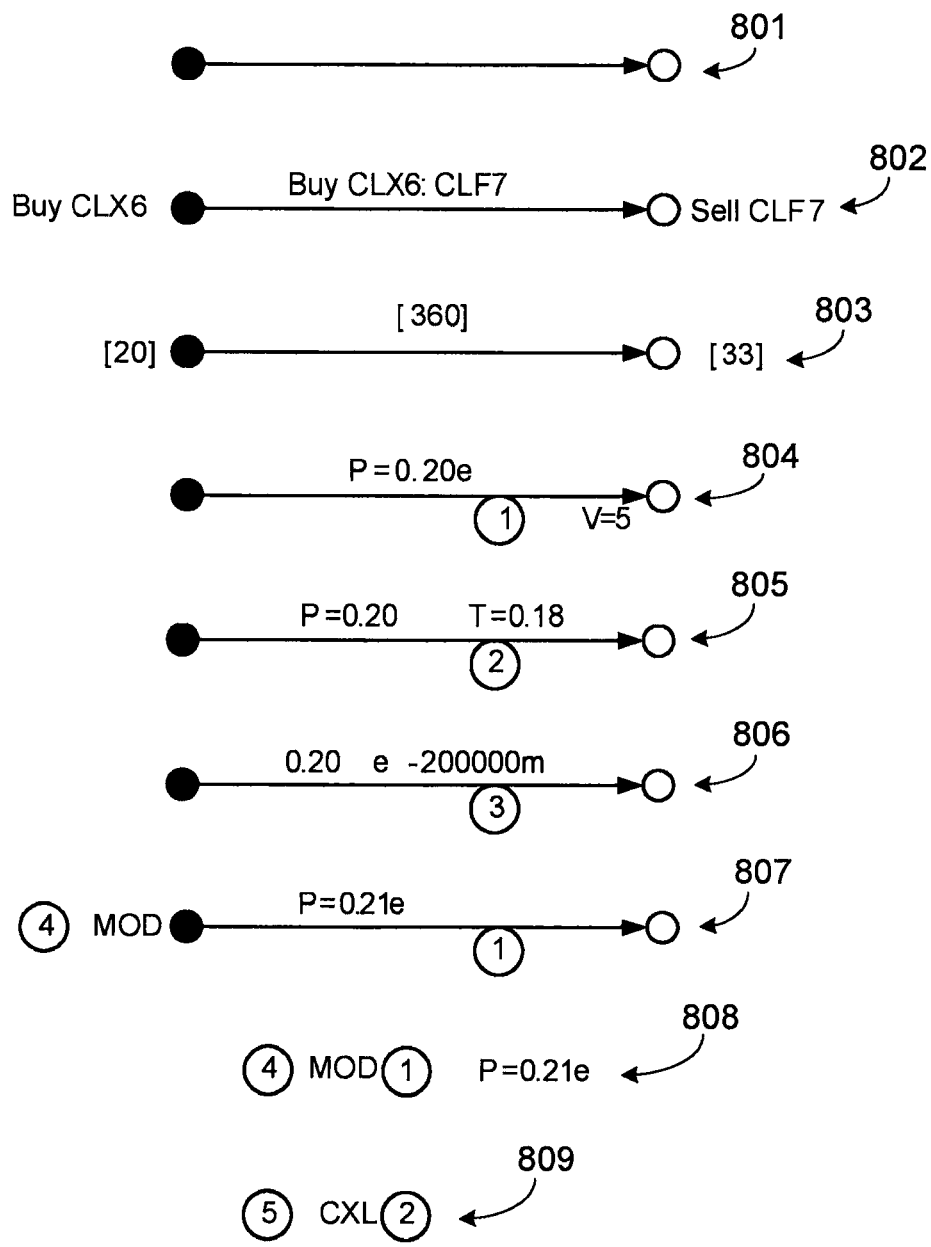

FIG. 10A illustrates example order elements with decorations. Some of the order elements, e.g., 801-807, are placed on the grid (e.g., of FIG. 8A or 8B) whereas others modify the orders on the grid, e.g., orders 808 and 809. This form is used if the order already appears on the grid and spares the user of the language from writing down redundant data. Order 801 illustrates a basic order, i.e., a "bare order" without decoration. Order 801 does not indicate anything other what is being bought and what is being sold by virtue of its placement on the grid. Order 802 indicates the contract name ("CLX6:CLF7", i.e., November 06 to January 07 crude oil spread) and the legs (CLX6 and CLF7). These indicators may be useful if the order details cannot be determined by the grid position, or if the order is being illustrated off of the grid. Order 803 includes Contract Identifiers ("CID") as they would appear in an XML message for a specific trading system. For example, if order 803 is the XML translation of order 802, [20] is the XML message that refers to the CLX6 leg, [33] refers to CLF7 leg and [360] refers to the CLX6:CLF7 spread contract.

Order 804 indicates the price in external units ("P=0.20e"), the volume (V=5 lots) and the Order Number (the circled "1") in the message sequence. Order 805 illustrates a stop limit order, with a limit price ("0.20e") and a trigger price ("T=0.18"). Since no volume is indicated, the default volume of one lot applies. In various implementations, the default volume may vary. The order number is shown as well (the circled "2").

Order 806 indicates the external price ("0.20e") and the internal (or "machine") price ("−200000m"). External and internal pricing is discussed in the section entitled "Price Mapping."

Order 807 modifies an existing order. When entered in this form, the modification replaces the existing order element on the grid. The modification order 807 is given its own order number (the circled "4") and also indicates which order it modifies (order 1). Generally, only the parameters that are being modified are shown on the order. In this example, order 1 is being modified to reflect a new price, i.e., "P=0.21e." Orders 808 and 809 are shorter ways of entering modification orders. Order 808 accomplishes the same result as order 807. Order 809 cancels order number 2. Order modifications carry an event number because a modified order is sometimes required to take on the time priority of its modification instead of its original time of entry. The cancellation order is given its own order number (the circled "5") since this is occasionally useful in expressing the sequence of events.

Figure 10B:

FIG. 10B illustrates additional types of input events, as well as timer events. Timer events allow delay processing of input event by a certain number of "ticks," each of which is a predetermined increment of time. An example of an administrative event is "Set Contract States", e.g., from pre-open to open. For this event, the specification in MEML will have an initial state shown as a grid with orders, the event itself, and a final state also shown as a grid.

Orders (such as those shown in FIG. 10A) can be placed or arranged on the grid in a variety of ways. FIG. 11 illustrates the same order grid, but with orders illustrated in three different ways. Each of the illustrated orders is to buy or sell NGK09 (natural gas, delivery May 2009). In example 901, the sell order for NGK09 (order number 1) is placed above the buy order for NGK09 (order number 2) because it is at a higher price. This is an example of orders that will not trade. Example 902 illustrates orders grouped visually by price level. Buy orders at a higher price are toward the top of the grid whereas those at a lower price are toward the bottom. This orientation is useful in specifying how the match engine should process a large volume input order that sweeps down through several levels. Example 903 illustrates orders in the sequence in which they were received, i.e., by order number.

Figure 12:
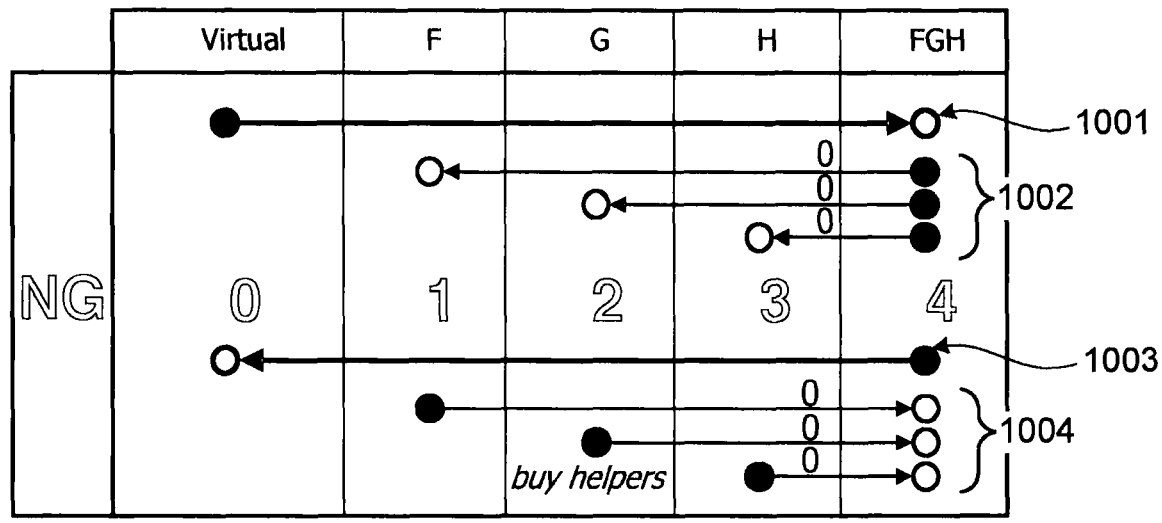
Figure 12A:
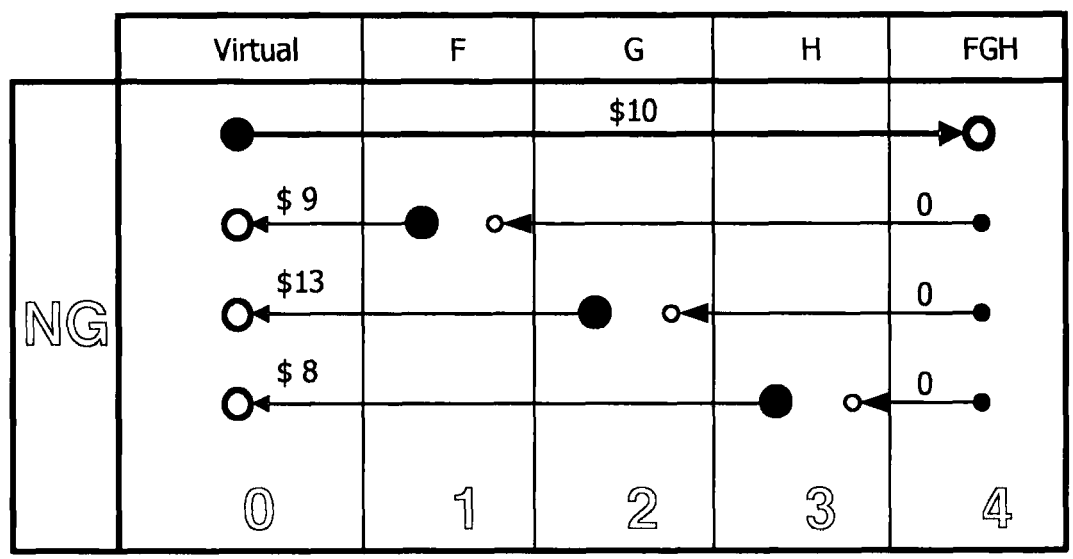

FIG. 12 illustrates the placement of primary sell order for a quarterly natural gas strip 1001 and the associated sell orders 1002 in each of the constituent months. FIG. 12A shows how the strip order with its helper orders can combine with three outright orders in the component legs. A trader can enter the strip order at the desired price of $10. The match engine will combine the strip with resting outrights in all but one of its legs and publish the best implied outright in its market data. A trader that enters an order to match this implied outright will trade with the strip and all of the other outrights. This procedure encourages traders to enter strip orders because they will be filled at the best possible price. Also, FIG. 12 illustrates the placement of a primary buy order for a quarterly natural gas strip 1003 and the associated buy orders 1004 in each of the constituent months. Primary order 1001 and helper orders 1002 can trade against primary order 1003 and helper orders 1004.

Figure 13:
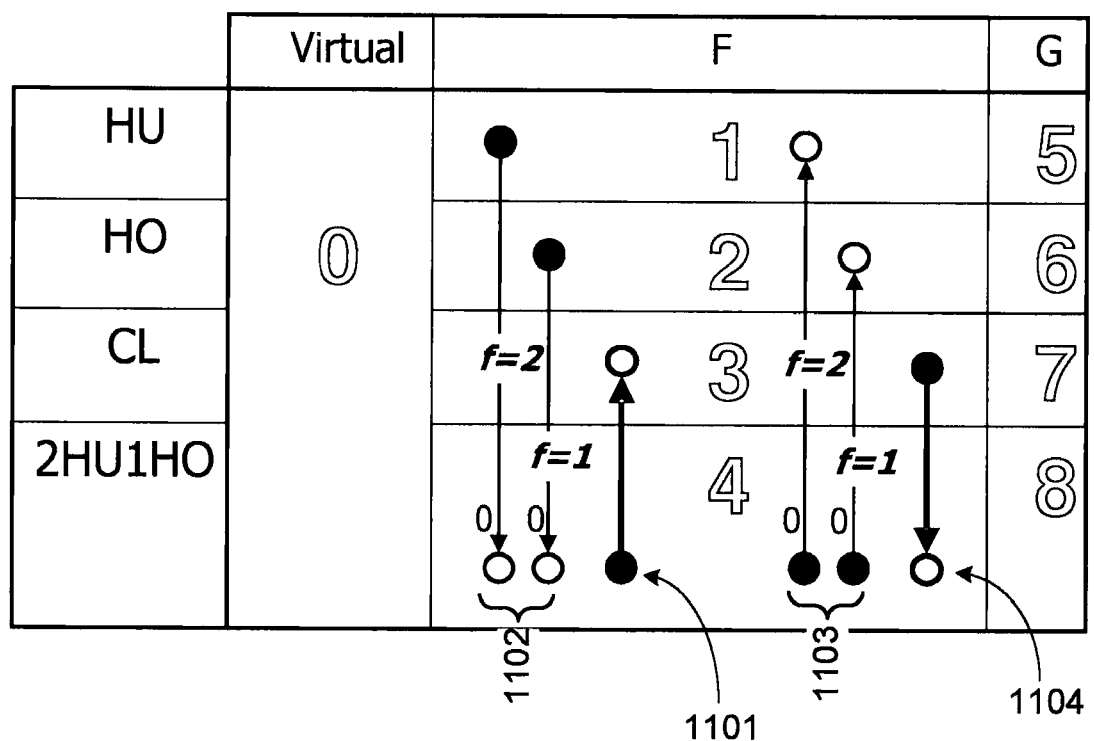

FIG. 13 illustrates the equivalent placement of primary orders 1101 and 1104 and their helper orders 1102 and 1103.

Figure 14:
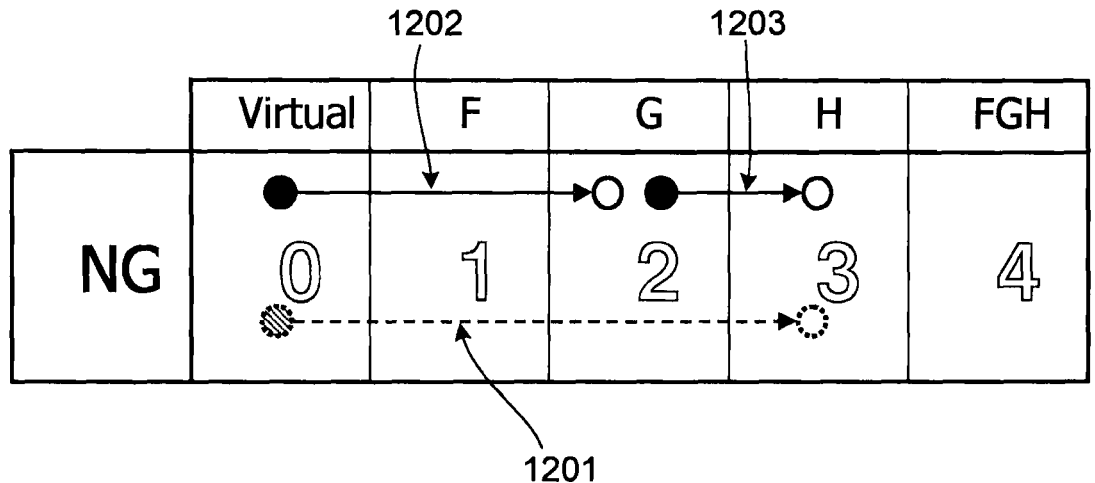
Figure 15:
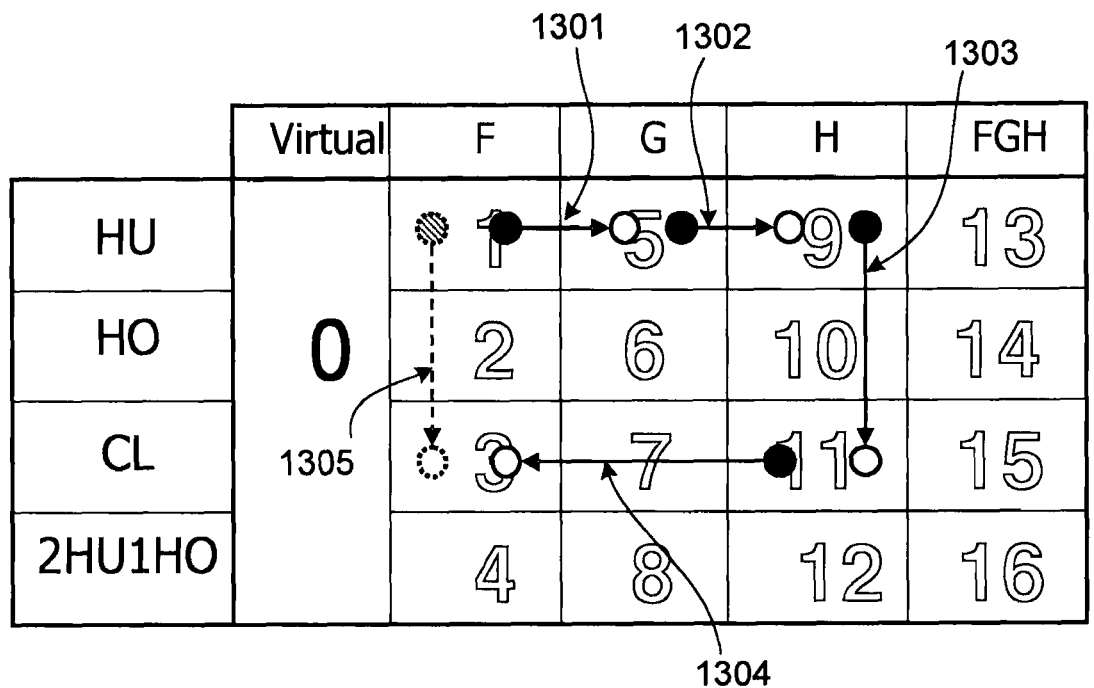
Figure 16:
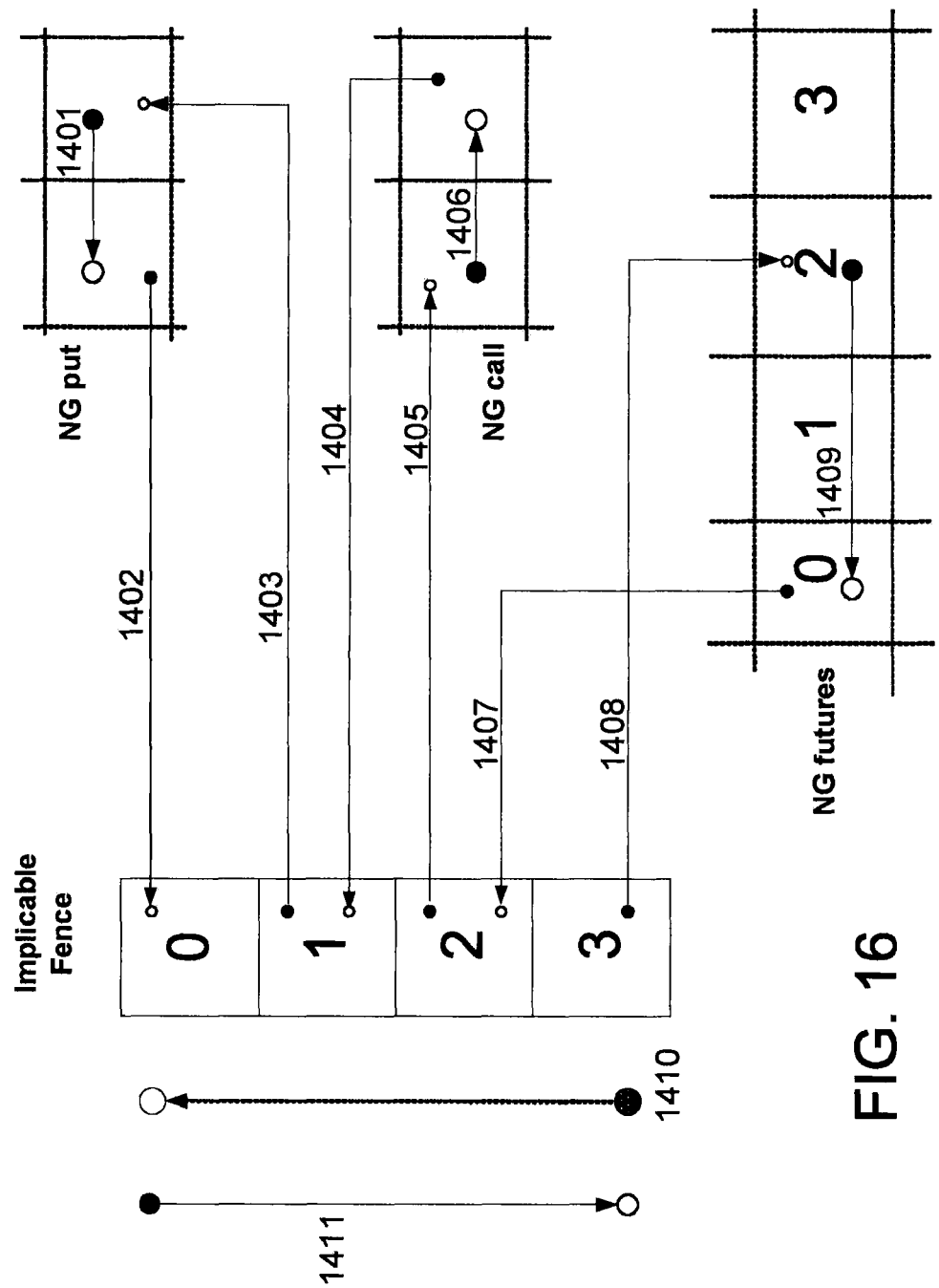

Any combination of orders that allows a path to be traced from the buy end of the first order to the sell end of the last order can imply an order drawn directly from the first buy contract to the last sell contract. This principle is illustrated in FIGS. 14-16. The rules for drawing an implied order depend on the states of the contracts represented by the grid elements, the chain descriptors in the implication policy (if one exists, see FIG. 25) and the contracts that exist in the match engine being modeled.

FIG. 14 illustrates an outright sell order 1201 for natural gas, February delivery (NGG). Spread order 1203 buys NGG, and sells natural gas, March delivery (NGH). This implies an outright order 1201 for NGH.

FIG. 15 illustrates a spread order 1301 that buys HUF and sells HUG. Spread order 1302 buys HUG and sells HUH. Crack spread 1303 buys HUH and sells CLH. Spread order 1304 buys HUH and sells CLF. These orders imply an HUF:CLF crack spread order 1305.

FIG. 16 illustrates the definition of an implicable fence in MEML. The fence is a type of option+future combination sometimes referred to as a position or strategy, since trading systems in the past have typically not defined the more complex combinations as tradable products in their own right. The helper orders make it possible for the resting put, call and future to imply the fence. They also make it possible for the trader to enter a fence order and have the match engine combine it with a resting call option order and a resting future order to imply the put. A trader wanting to take this position can do so in a single transaction. This eliminates the problem of leg risk, where the trader attempts to put on the position with a series of independent transactions, leaving him or her open to the risk of being caught with only part of the position established before the market moves against them. A trader not subject to leg risk can trade more aggressively, which in turn increases the overall volume traded at the exchange.

Figure 17:
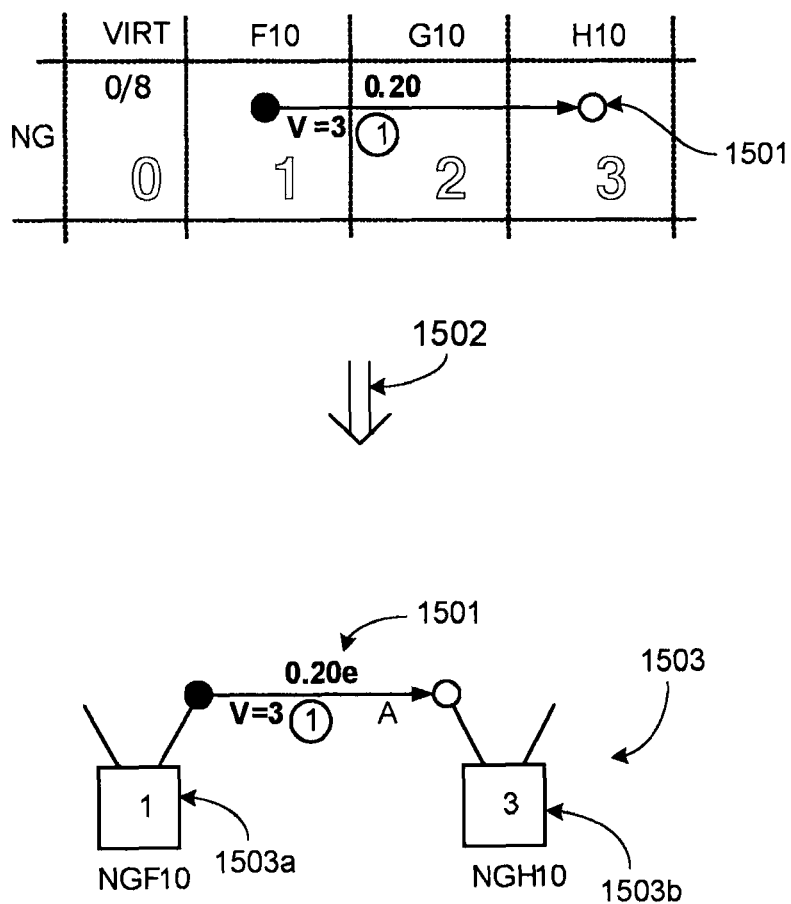

Once orders are placed on the grid, the match engine performs trades. To perform a trade, the first order in time priority is taken from the grid and placed on a chain. FIG. 17 illustrates a single order 1510 for 3 lots of an NGF10: NGH10 spread on the grid. This order is "followed by" (1502) or results in the chain 1503. This expression in MEML specifies only a small part of the sequence of operations required to process the incoming order 1501. Grid element 1 corresponds to chain element 1503*a* and grid element 3 corresponds to chain element 1503*b*. Order 1501 connects the buy node of chain element 1503*a* to the sell node of chain element 1503*b*. Thus, the specification calls for a resting trade path (consisting of only a single order in this case) to be created from the NGF10 contract to the NGH10 contract. In a full specification this would be preceded by an input and followed by additional steps resulting in trades, market data and a final order state.

Figure 18:
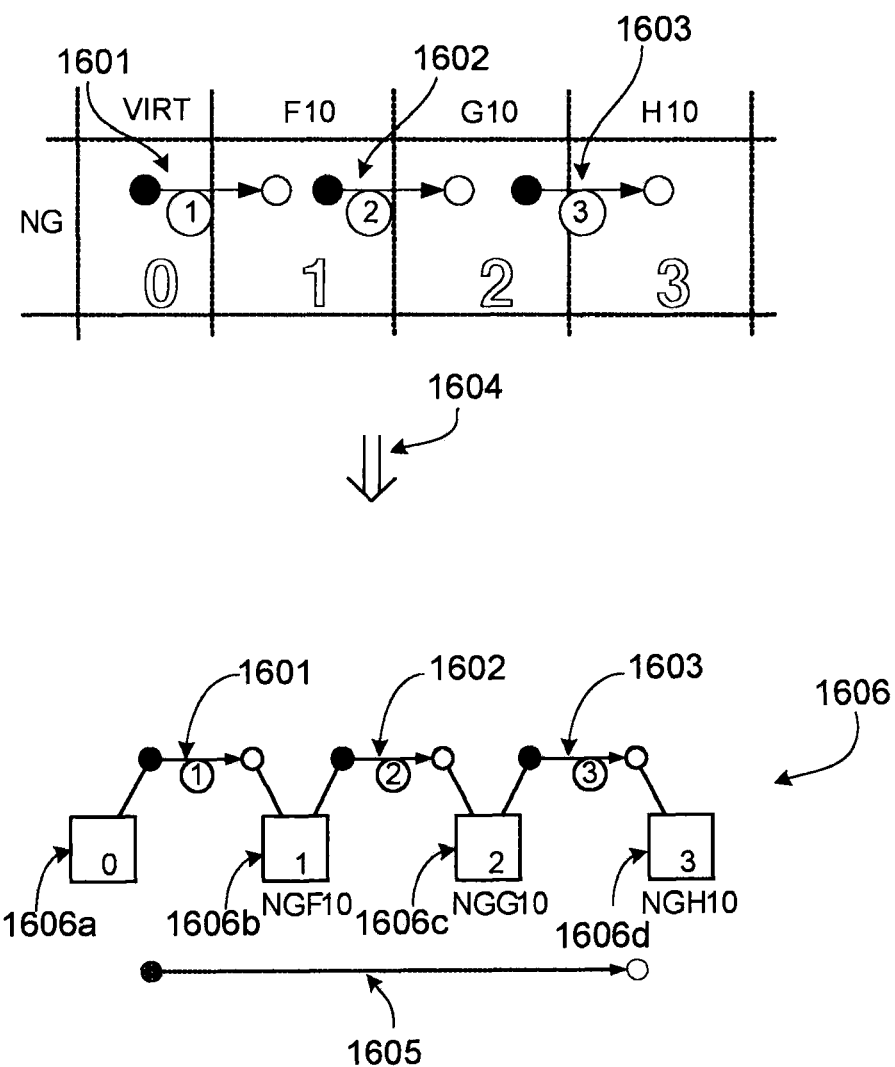

FIG. 18 illustrates three orders 1601-1603 on the grid. The first order, 1601, is an outright sale of NGF10. The second order, 1602, is an NGF10:NGG10 spread. The third order, 1603, is an NGG10:NGH10 spread. This order is "followed by" (1604) or results in the chain 1606. Grid element 0, i.e., for the virtual contract, corresponds to chain element 1606*a*. Grid element 1 corresponds to chain element 1606*b*, grid element 2 corresponds to chain element 1606*c* and grid element 3 corresponds to chain element 1606*d*. Order 1601 connects the buy node of chain element 1606*a* to the sell node of chain element 1606*b*. Order 1602 connects the buy node of chain element 1606*b* to the sell node of chain element 1606*c*. Order 1603 connects the buy node of chain element 1606*c* to the sell node of chain element 1606*d*. Thus, a trade path is created from the virtual contract to the NGH10 contract, which implies an outright sell order 1605 for NGH10.

As described in more detail herein, the movement of the order element (e.g., items 1501, 1601-1603) from the grid to the chain corresponds to the selection of the best combination of resting orders.

Figure 19:
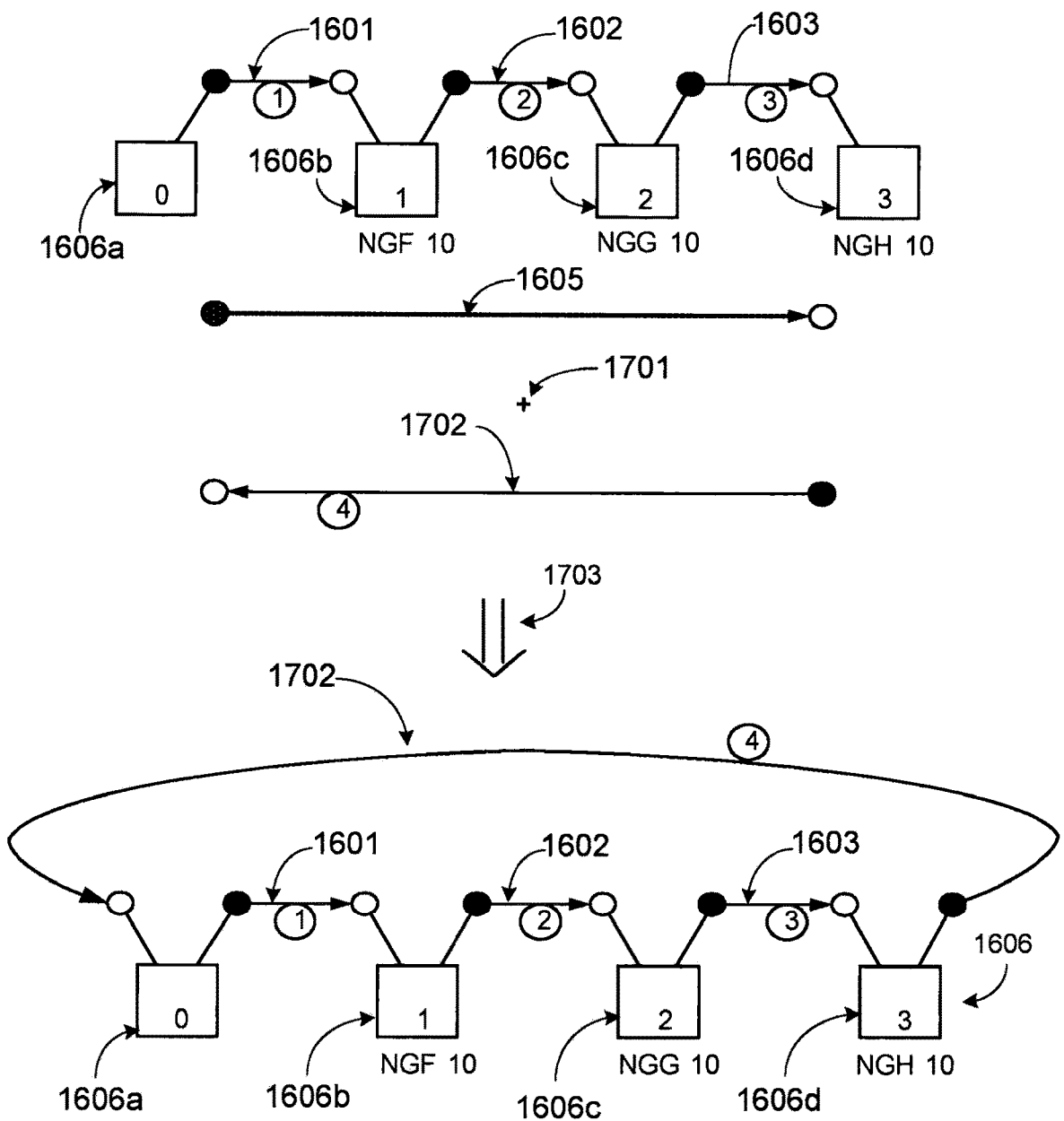

FIG. 19 illustrates the creation of a trade circuit by connecting the ends of the trade path with an input order. As described in connection with the semantic mapping, all cyclic permutations of the circuit will produce the same trades. It is therefore possible to permute the circuit and break it at a different location to simplify certain calculations, such as the determination of leg prices. In particular, FIG. 19 illustrates what occurs when the resting orders (e.g., those that are "on the book") of FIG. 18 can be matched to an incoming order. As discussed, the orders of FIG. 18 imply an outright sale of NGH10. In FIG. 19, an incoming order 1702 is added to the grid (via symbol 1701). Order 1702 is an outright buy of NGH10. This results in or leads to (1703) the chain elements 1606. Order 1702 completes a loop from the buy node of chain element 1606*d* to the sell node of chain element 1606*a*.

Figure 20:
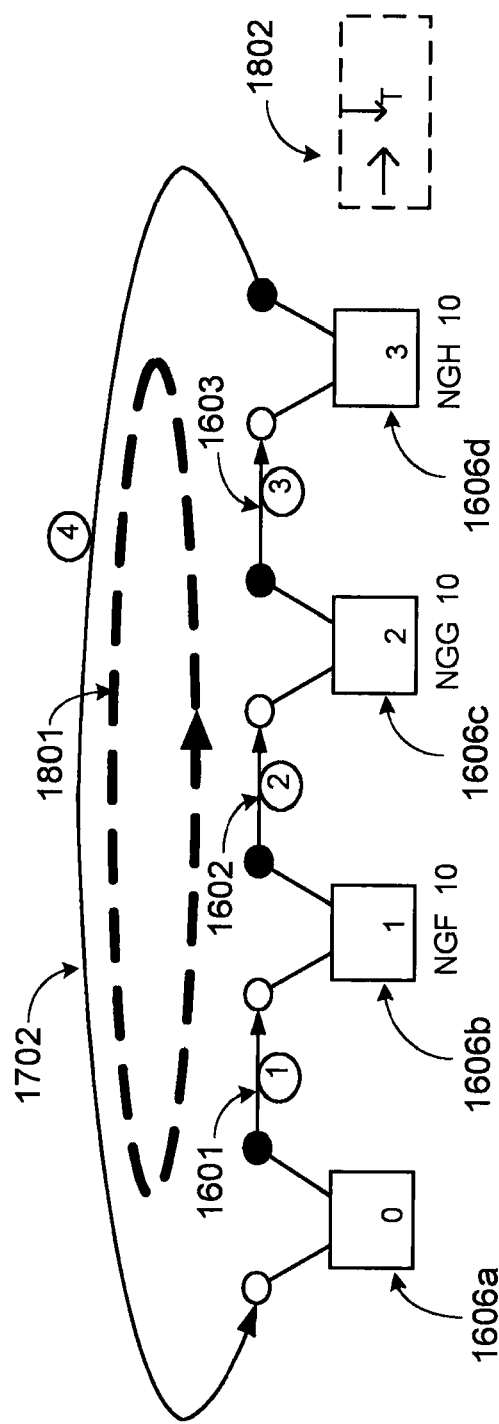

FIG. 20 illustrates the role of the trade builder element ".fwdarw.T" (1802). Although a chain representation allows a list of trades to be written at any time, not every chain corresponds to a trade. Chains may be constructed to test the tradability of a path or permuted for leg pricing. The trade builder element (1802) is used to indicate that a sequence of activities that includes this chain requires trades to be communicated to the trading network outside the match engine. In this case, the trade builder element (1802) indicates that: order 1 (1601) should be executed for V lots, order 2 (1602) should be executed for V lots, order 3 (1603) should be executed for V lots and order 4 (1702) should be executed for V lots. Trade volume travels in the direction indicated by arrow 1801.

FIG. 21 is a table that illustrates some of the chain descriptors that can be formed from the visual and textual chain elements (see, e.g., FIGS. 7A and 7B). The simplest of these is "FFIS," where two outright futures in the same product but with different delivery periods imply a calendar spread. The abstract syntax for forming chain descriptors is related to the abstract syntax for placing orders on a grid. For example: (1) outright futures are adjacent to each other, e.g., FSSSSIF, SSFFSSIS and SSSSFIF are allowed, SSFSSIF is not; (2) the number of outright futures is zero or two; (3) if a pattern has a crack spread ("X"), there are either two outrights or another crack spread in the pattern and (4) if there are both calendar spreads ("S") and crack spreads ("X") in the pattern, there are least two of each, e.g., XSXIS is valid but XSIS is not. A set of chain descriptors can be used to specify an implication policy, as will be seen in the section on Semantic Mapping (see also FIG. 25). Thus, the chain descriptors can be used to program a match engine by indicating which combinations imply other markets.

Syntactic Mapping

The syntactic mapping relates expressions in the MEML to expressions in other languages. The mapping is syntactic because the translation of one expression to another can be defined purely in terms of the symbols involved.

In some implementations, a contract is associated with a pair of grid elements (see, e.g., FIGS. 8A and 8B) in the match engine being modeled and with a contract identifier and contract symbol in the trading network as a whole. An order in the trading network is represented as an XML document constructed according to a schema. The order schema and the relationship between grid numbers and contract identifiers may be used to construct a syntactic map.

Figure 22:
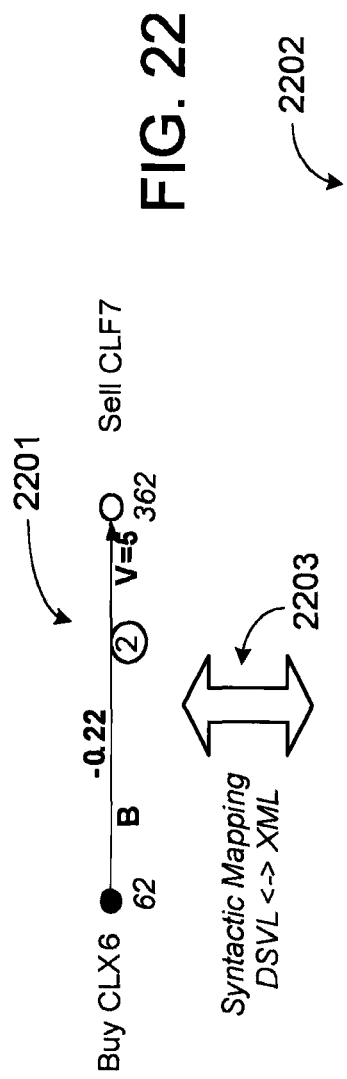
FIG. 22 illustrates the syntactic mapping of an implementation of a MEML.

An example of a mapped expression in the MEML is shown in FIG. 22. The order 2201 on the grid is to buy the November 2006-January 2007 crude oil spread. The buy node is on grid element 62 and the sell node is on grid element 362. It is labeled as order number 2, with a volume of 5 at the price of −0.22. The syntactic mapping 2203 converts the order 2201 into the XML expression 2202. The visual aspects of the order are translated into a textual expression. For example, the visual position that the November 2006-January 2007 crude oil spread occupies is replaced with a numerical contract identification ("CID"). The CID uniquely represents each tradable contract in a given trading system. The order number is translated as an "OID" value, the volume is translated as a "TL" value and price is translated as a "Price" value. The direction of the arrow, i.e., that the order is a buy, is translated into the "BS" value.

In some implementations, the interaction with a terminal (e.g., a mouse click) that places an order element on a screen display of a grid is associated with executable code that calculates the new markets implied by the new order. The visual properties of the order are mapped to numerical values that can be passed as arguments to the executable code. The results of the calculation are displayed visually on the terminal screen.

Semantic Domain

The Semantic Domain of the MEML consists of the real-world entities that can be represented by expressions in the language.

The real-world entities in the semantic domain of the MEML are states, input events, and output messages of a system for electronic computation, where the system has been described as a Finite State Machine. These real-world entities are associated with physical states of an electronic computer and its peripheral equipment. Generally speaking, any computing system can be described as a Turing Machine, which is a specific type of Finite State Machine. A modeling language whose semantic domain consists of match engines that can be described as Finite State Machines is capable of specifying every possible match engine.

The operations of a match engine are generally executed by one or more computing systems, and may be performed in more than one part of a trading network or in related systems. For example, the calculation of implied markets may be done by traders at their trading stations in search of arbitrage opportunities between trading networks or match engines. It is also possible to perform these calculations outside a trading network for the evaluation of possible trading strategies, for instruction, regulation or in the solution of other problems where trading is used as a model.

Definitions may vary, but generally speaking, a Finite State Machine has the following properties: (1) it is always in one of its finite number of states, or making a transition from one state to another; (2) it changes state only in response to external input events drawn from a finite event set; (3) it produces output (in the form of messages) only when it makes a transition; and (4) it is described completely by a list of states and transition rules, e.g., if the machine is in state X and event E occurs at the input, go to state Y and output message $M_{.sub.XY}$.

The operations of a match engine may be described in the terminology of the Finite State Machine, e.g., as follows:
(1) input operations: (a) receiving an order from another component of the trading network in the form of an order message, (b) receiving a request to modify or cancel a previously received order in the form of a modify or cancel message, (c) receiving administrative messages, e.g., to open or close a set of markets and (d) receiving timer messages related to events that occur on a regular basis;
(2) initial state: the match engines starts in a pre-defined initial state;
(3) state transitions: each input event is associated with a process that implements the transition rules associated with the current state of the match engine, e.g., processes such as (a) storing a received order, (b) canceling or modifying a previously stored order, (c) matching a received order against one or more previously stored orders and calculating the matched trade information, (d) calculating implied markets, (e) changing the state of a market and (f) changing an implication policy; and
(4) output operations: (a) acknowledgement, e.g., transmitting a message to the sender of the input message to confirm its reception, (b) trading, e.g., transmitting matched trade data to another component of the trading system for ultimate communication with the affected traders, (c) Market Data, e.g., transmitting market data on real and implied markets to other components of the trading network and (d) Administration, e.g., transmitting administrative messages such as informing the sender of an administrative message that the requested action has (or has not) been carried out.

The state space of the match engine may be factored into a Cartesian product of independent state spaces. If the states in the independent state spaces are assigned numbers, then the Cartesian product may be represented as a vector of state numbers, with an element for each independent space. If the states in the independent state spaces are identified visually, then a state in the Cartesian product is identified by an ordered arrangement of visual expressions.

The existence of a state in the state space does not imply that the state is accessible, nor is it necessary to model every state of the match engine with the MEML. For example, there may be a defined state where a closed contract contains orders, but this state will never be reached because the administrative message that closes a contract has a transition rule that requires the orders in that contract to be removed.

The factoring does not have to be complete in order to be useful. For example, a match engine may have one set of states where the output messages contain prices with decimal points and another set of states where they do not. Although the MEML could be extended to cover this binary factor (e.g., by using different colors for otherwise identical expressions), in some implementations there is little practical advantage in doing so. The factoring may be expressed as the product of well-defined spaces for modeling with the MEML and a "remaining space" for which other methods may be more appropriate.

The first factoring expresses the state space of the match engine as the Cartesian product of the contract space, the implication policy space and the remaining space.

The contract space is the Cartesian product of the individual contract spaces, each of which is the Cartesian product of the following: (1) contract market state, e.g., open or closed, (2) contract order state, defined by the values of the resting orders in a contract, e.g., orders stored in the match engine "waiting" for a matching input order and (3) additional contract states, which may be defined as needed. The contract order state changes when an order in a contract is added, removed or modified, either directly or through trading.

The contract order state space has boundaries which may vary over the course of a trading day. If the boundaries can be adjusted with input events (e.g., an administrative message to change the state of a market) then the match engine must respond by transitioning to an order state within the allowed boundaries. For example, a contract in the open state is not allowed to have crossed orders. However, a contract in the pre-open state is allowed to have crossed orders (where the bid prices exceed the ask prices) because no trades can take place until the market is opened. When an administrative message arrives to change the contract state from pre-open to open, the match engine follows a special procedure called "leveling" to trade out the crossed orders in a systematic way.

The implication policy specifies which combinations of orders may be used to imply additional markets. Also, an implication policy can limit the number of implied markets calculated by the match engine. This allows a general match engine to simulate the operation of a less powerful system. For example, a match engine that implements the unlimited combinations of outrights and spreads described in commonly-assigned U.S. Pat. No. 7,039,610 could have an implication policy of {OOIS, OS . . . IO, S . . . OIO,S . . . SIS}, where the ellipsis indicates an unlimited number of repetitions. Such a match engine might be capable of trading strips, ratio spreads and arbitrary combinations, but would be prevented by the implication policy from doing so.

Semantic Mapping

The semantic mapping associates expressions in the MEML with the real-world entities they represent. As described above, these entities are the input events, states, transition rules and output messages of the Finite State Machine that describes the electronic computation system that implements the match engine. The entities will be described in turn.

Input Events

An input event to the match engine is, e.g., (1) Add, (2) Modify, (3) Cancel, (4) Admin and/or (5) Timer. The input events are expressed as orders with decorators or related event symbols as shown in FIG. 10. In some implementations, the occurrence of an input event corresponds to the arrival of an XML message. The arrival of an XML message may have originated as a order in the MEML format (e.g., of FIG. 10) that was entered by an analyst using a terminal.

Figure 23:
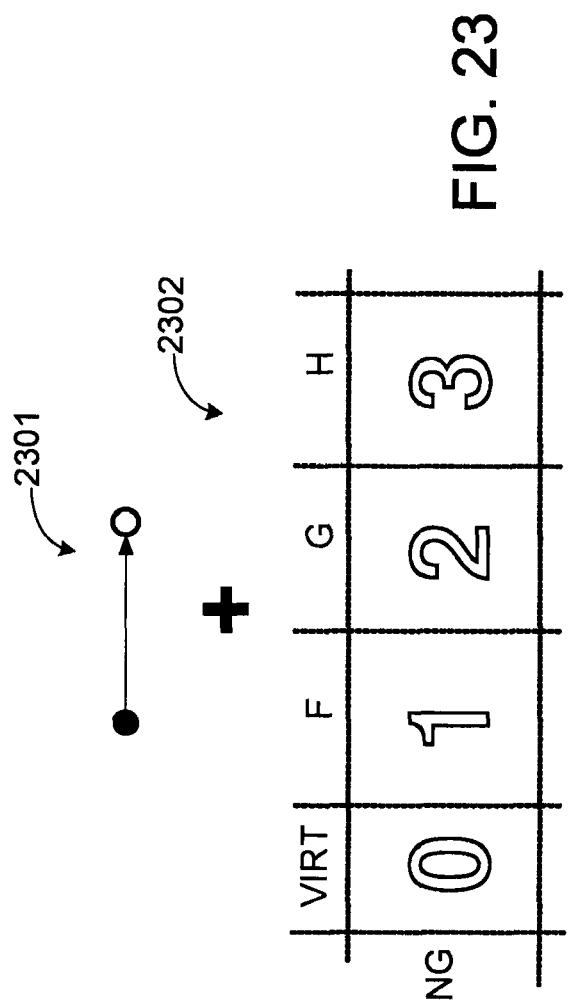

The occurrence of an event is depicted in the MEML by an order or event symbol, a state expression and a plus sign between them, as shown in FIG. 23. In the example of FIG. 23, order symbol 2301 corresponds to selling the January-February natural gas spread. The state expression 2302 corresponds to the state of the market. In this example, no matching orders are on the book.

A sequence of events may be depicted by a sequence of visual expressions. However, this may be expressed more conveniently by distorting the state grid and placing the orders according to FIG. 9 or 24, e.g., ranking by price and time. This form of expression can be used to describe the creation of a precondition for a subsequent event of greater interest. For example, the transition of a contract from pre-open to open requires a special procedure called leveling which is complex to describe and test, especially when large numbers of orders are involved. Visual grouping of orders on an expanded grid can be used to clarify which orders are traded at different steps in the leveling.

Price Mapping

Orders in the external world (i.e., from the perspective of a market participant) may be either buys (bids) or sells (asks). The prices of these orders may be positive or negative, but in general a trade is possible when the bid is equal to or better than the asking price.

In the MEML there are two types of prices: (1) external (common, verbal) prices signified by an "e" in the concrete syntax and (2) internal machine prices signified by an m.

In placing an order on a grid, buys and sells are distinguished by their starting and ending points. The external prices of buy orders are multiplied by −1 and written with an "m" suffix. As a result, the sum of the machine prices of two prices that can trade will be equal to or less than zero.

The real-world criterion for tradability is mapped to the arithmetic criterion of summing to zero or less. This makes it possible for any number of orders to be tested for tradability. Moreover, any number of hypothetical trade sets can be constructed where all but one of the elements is present in the trade set matching system. The sum of the machine prices is the price that an incoming order must have to complete the set at a tradable price.

This technique may be applied generally and can be used to imply a resting order in any contract. Moreover, if more than one combination of resting orders implies into a given contract, their summed prices may be compared to determine which set creates the best implied.

A secondary but useful effect of this price mapping in some implementations is that lower is always better, since a greater bid is mapped onto a more negative (i.e., arithmetically lower) number. This simplifies the programming and reduces the chances of clerical errors.

States

A match engine has an initial state where it is ready to receive orders but has not yet received any. This is referred to as the "empty and open" state and can be represented visually by a collection of grids similar to those illustrated in FIGS. 8A-8C.

Contract market state can be represented through grid decoration. In the form shown in FIG. 8C, there are only two states: open and closed. In practice there is no limit on the number of market states that may be defined nor on the decorations that may be defined to represent them.

Figure 24:
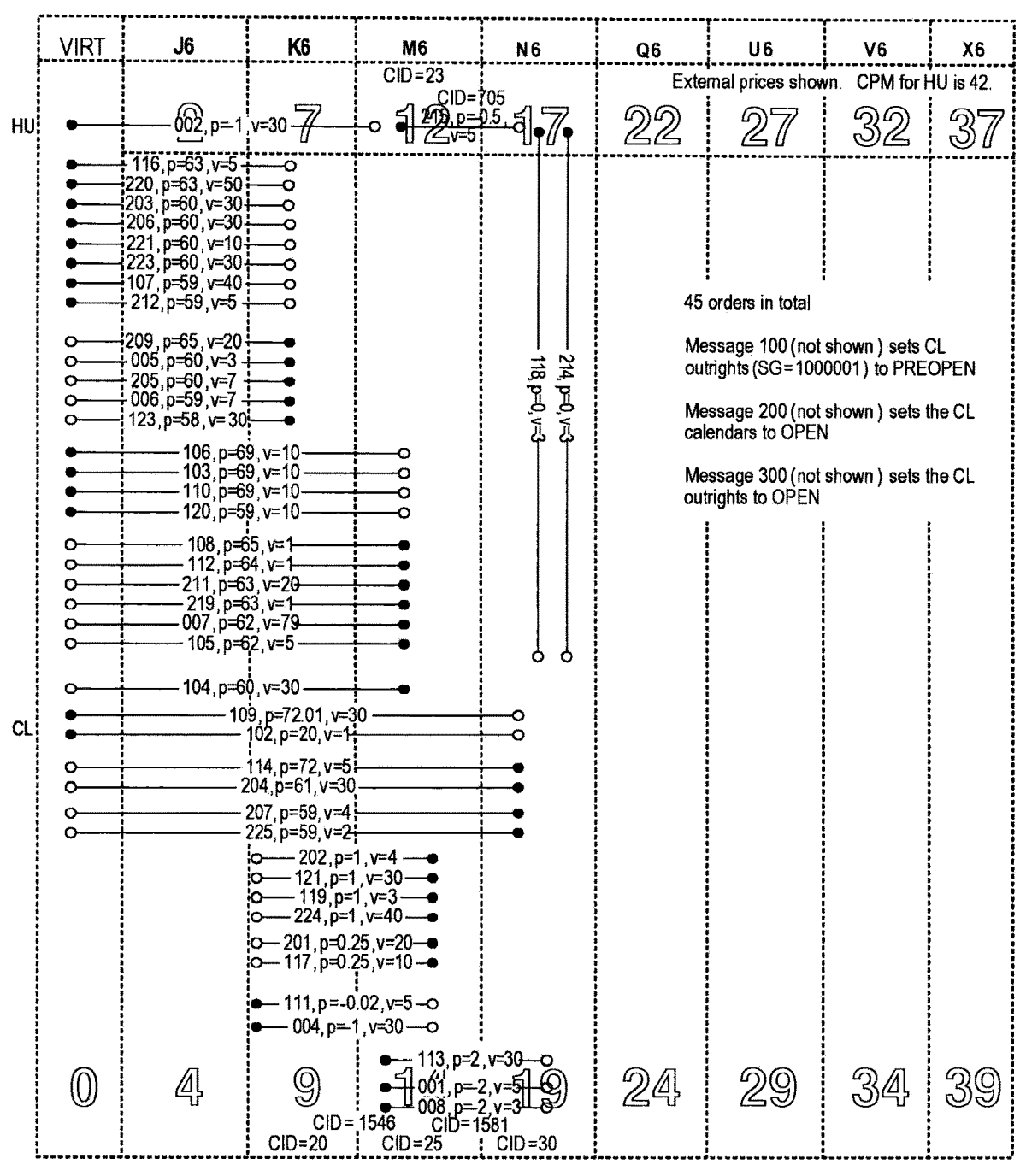

Order state can be indicated by the presence of order elements on a grid, e.g., as shown in FIG. 24. Orders for the same contract are prioritized (top to bottom) based on price and time (conveyed by the increasing order numbers). In principle, any type of priority rule can be expressed through the visual arrangement of order elements. In some implementations, regulations (e.g., those set forth by the Securities and Exchange Commission) may affect ability of an exchange to prioritize resting and incoming orders. Examples of allowed prioritizations could be expressed in MEML and used to create the test scenarios needed to verify that the relevant match engine complies with the regulations.

In some implementations, the order state of a match engine may be displayed on a computer screen. The orders may be grouped into price levels and only the levels of greatest interest (for example the best bid and best ask) may be shown. Filtering and zooming may be used to examine parts of the order state of particular interest. FIG. 24 is an example screen shot of an order state of an example of a match engine, with the resting orders grouped by price and time.

Implication policy state can be defined by the number of the implication policy currently in force. An implication policy is defined as a set of chain descriptors indicating the allowed combinations. Some examples of chain descriptors are illustrated in connection with FIG. 21. The chain descriptors can be extended with wildcard characters and symbols representing the union of sets, intersection of sets, subtraction of sets and the like, so that more complex policies can be expressed without having to enumerate all of the allowed combinations. FIG. 25 illustrates two examples (2501 and 2502) of implication policies. The first example 2501 is an example of an implication policy that permits first generation implieds only. The second example 2502 is an example of an implication policy that permits first and second generation implieds. The concept of first and second generation implied markets is discussed in commonly-assigned U.S. Pat. No. 7,039,610.

Admin messages can be used to change the implication policy (e.g., from 2501 to 2502) as appropriate.

Transition Rules

The general form of a transition rule is "if in state X and event E occurs, go to state Y and output message M.sub.XY". This structure is a known aspect of techniques for specifying computer programs.

Figure 26:
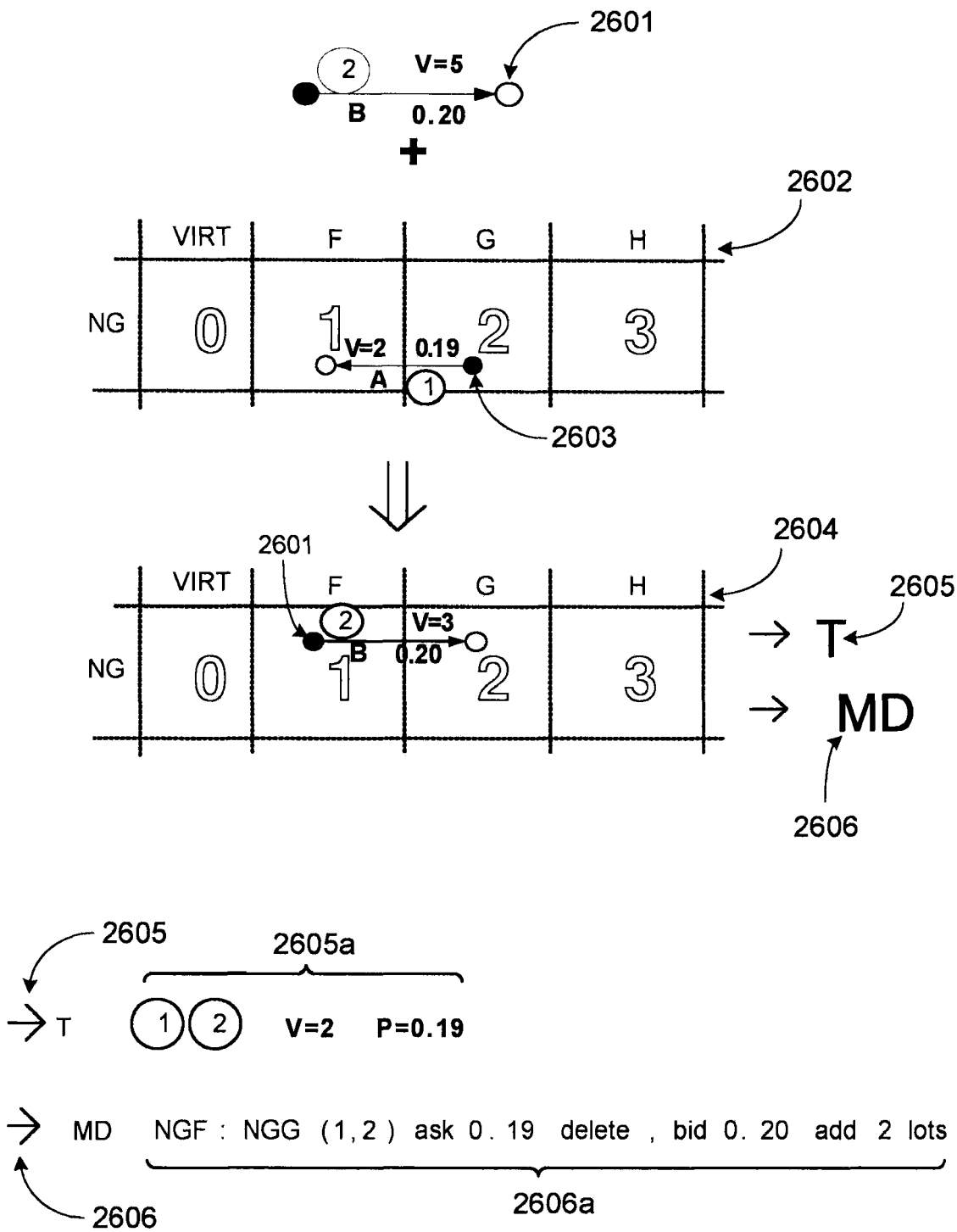

The MEML is capable of expressing any rule of this kind by showing the initial state, the input event, the final state and the message, as shown for a simple trade in FIG. 26. This alone would be sufficient to specify the behavior of a trade matching system and serve as input to the automated test tool.

In FIG. 26, the initial state 2602 comprises a resting order 2603 (i.e., order number 1). The resting order 2603 is to sell 2 contracts of the January-February natural gas spread, at an internal price of 0.19. The input event 2601 (i.e., order number 2) is to buy 5 contracts of the January-February natural gas spread, at an internal price of 0.20. The final state 2604 comprises order 2601, which is for the remaining volume of three contracts after order 2601 trades against resting order 2603.

The MEML also may be used to derive the intermediate steps of the process used to compute the final state, as will be discussed herein.

Output Messages

Generally speaking, a match engine produces two types of data: (1) Trades messages and (2) Market Data messages. This data can be transmitted to other components of the trading network in many different ways. For example, the match engine can be coupled to a network (e.g., local area, wide area, the internet, etc.) to which other components of the trading network are coupled. Also, the match engine can provide visual output to a display for viewing by traders (e.g., in a trading pit).

For trade data, when two or more orders trade with each other, the originators or owners of the orders are informed of the specific orders being traded, the trade price, the quantity traded and the time of the trade. In the MEML, this data is obtained by iterating a chain as shown in FIG. 20. In some implementations, there is no expression in the MEML to represent the output message since in practice the chain will either be mapped syntactically to a message for a specific trade matching system or to a visual display that does not need to be formally defined. Instead, the MEML provides the trade builder symbol ".fwdarw.T" to indicate that the trade data available at this point in the process should be added to the Trades message.

In some implementations, the chain is displayed on a computer screen (e.g., in a spreadsheet) and the changing of a parameter (e.g., an order price) causes the new trade data to be calculated automatically and displayed on another part of the computer screen. The ".fwdarw.T" symbol can be displayed on a button (e.g., 1802 of FIG. 20) which can open or close the window used to display the trades data.

For market data, the users of the match engine are informed of the orders that are available for them to trade with. The exact data to be sent to a specific trader may depend on criteria outside of the match engine. For example, a match engine in a trading network where users can select offers only from specified counterparties ("bilateral trading") provides the relevant owner identification in its market data. A trading network without bilateral trading does not require this data from its trade matching system.

In the MEML, the market data output for a given input event is obtained by computing the difference between the initial order state and the final order state. In some implementations, there is no expression in the MEML to represent the market data since in practice the state difference will either be mapped syntactically to a message for the specific trade matching system or to a convenient visual expression that does not need to be formally defined. Instead, the MEML provides the market data builder symbol ".fwdarw.MD" to indicate that the market data available at this point in the process should be added to the market data message associated with the event.

In some implementations, the grids before and after the event are displayed on a screen. Clicking on market data icon causes the difference to be calculated and displayed in a format consistent with the market data from the trade matching system being modeled. Clicking on a trade data icon causes the new trade data to be calculated automatically and displayed on another part of the computer screen. A screen shot of such an implementation, already discussed in part, is shown in FIG. 26.

Adjacent to the final state 2604 are the trade data 2605 and market data 2606 icons. Clicking either icon results in the generation of the respective trade data 2605a or market data 2606a. As shown, the trade data 2605a indicates that orders 1 and 2 traded against each other at a volume of 2 contracts and a price of 0.19. The market data 2606a indicates that the available volume in the January-February spread contract has changed and that the ask at 0.19 has been deleted and 2 lots bid at 0.20 has been added.

Pragmatics of the MEML

The pragmatics of a modeling language are formed by "the relation of its signs to (human) interpreters."

As previously discussed, the MEML can be used in a simple declarative mode to specify transition rules in the form of "input plus initial state leads to output message and successor state. The MEML can also be used in the imperative or "conative" mode by a human designer to derive expressions showing what the trade set matching system "should" do in transitioning from one state to another.

Figure 27:
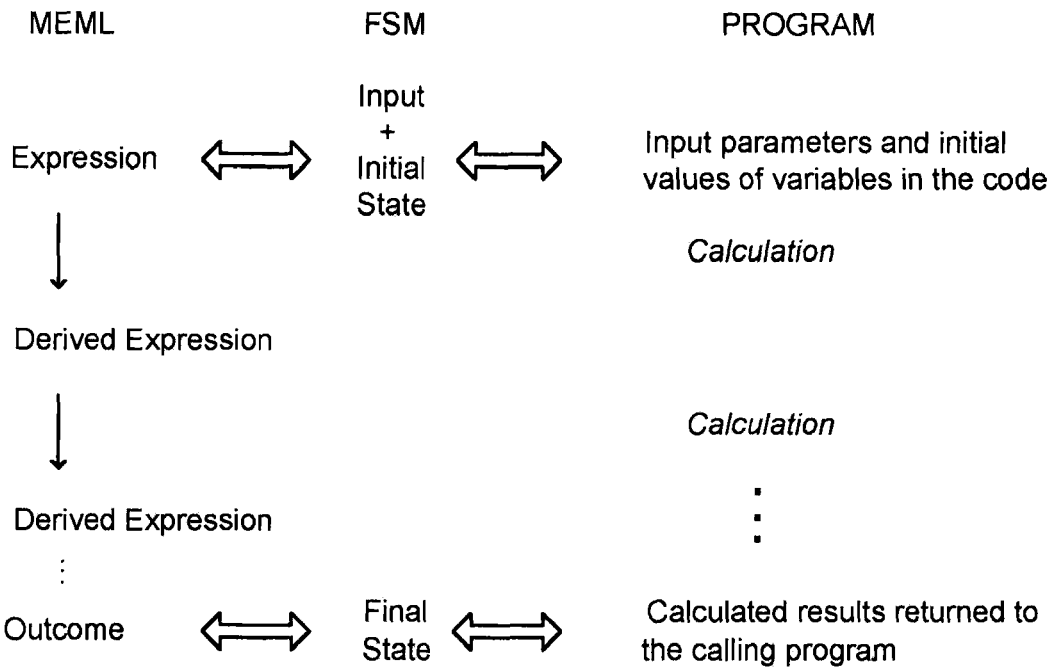
FIGS. 27-34 illustrate the pragmatics of an implementation of a MEML.

The abstract syntax and a set of rules for transforming one expression into another make it possible to derive the final state visually (e.g., the progression from 2602 to 2604 due to the event 2601 of FIG. 26). The steps in the derivation correspond to arithmetic operations performed on the data representing the state and the event. A sequence of visual transformations can be equivalent to a sequence of calculations, e.g., as illustrated in FIG. 27. In general, the transformation rules can be applied to any MEML expression (e.g., a new order type) to create an algorithm and ultimately a computer program to use in a match engine.

In FIG. 27, the column labeled "MEML" corresponds to input or output expressions in the MEML. The column labeled "FSM" corresponds to the states of the Finite State Machine, i.e., the computer that implements the match engine. The column labeled "Program" corresponds to the input and output of the computer program that implements the match engine. Accordingly, the initial MEML expression is input to the Finite State Machine in its "initial state." The initial MEML expression corresponds (via syntactic mapping) to input parameters to the code (e.g., compare 2201 and 2202 of FIG. 22). Also, the code is in an initial state that corresponds to the initial state of the Finite State Machine. After processing, the outcome in the MEML expression and the calculated results in the computer program correspond to the final state of the Finite State Machine. When the computer program properly implements the model set forth by the MEML, the results of the MEML calculation and the computer program are consistent.

The transformation rules for the MEML may express constraints placed on the match engine by the business of electronic trading and as such, can vary from one exchange (or other entity that administrates the match engine) to another. They may be considered either as a semantic mapping for a specific exchange or as pragmatics of a language that can vary from one group of human users to another.

In some implementations, some or all of the following business requirements are incorporated into rules for transforming one MEML expression into another:

(1) Intercommodity spreads are only allowed between futures contracts with the same delivery month, (2) Only the best implieds need to be reported in the market data, (3) Resting orders trade in price-time priority, (4) An implication policy can limit the number of implieds,
(5) Trade price is determined by the resting orders, and
(6) Leg prices in spread trades are based on the latest published price.

Regulatory compliance may require modification of these requirements, or that additional or different requirements are incorporated into the transformation rules. These rules make it possible to derive representations and matching algorithms for new order types. Each of these rules will be discussed in turn.

Restriction of Intercommodity Spreads to a Common Contract Month

In some implementations, intercommodity spreads can only be defined between futures contracts with the same delivery period. For example, HOF8:CLF8 (Buy January 2008 Heating Oil:Sell January 2008 Crude) is an allowed spread whereas HOF8:CLG8 is not (Buy January 2008 Heating Oil:Sell February 2008 Crude).

In some implementations, the abstract syntax for constructing a grid requires that futures with the same delivery periods be placed in a vertical column. The business requirement that intercommodity spreads be restricted to common contract month is mapped onto the visual requirement that orders be drawn either horizontally for calendar spreads or vertically for intercommodity spreads. In implementations having these rules, diagonal lines are not allowed on the grid. Note, however, that some implementations may not allow entry of orders that require a diagonal line, but may imply non-tradeable markets that require one or more diagonal lines on the grid.

Only Best Implieds are Reported

Figure 28:
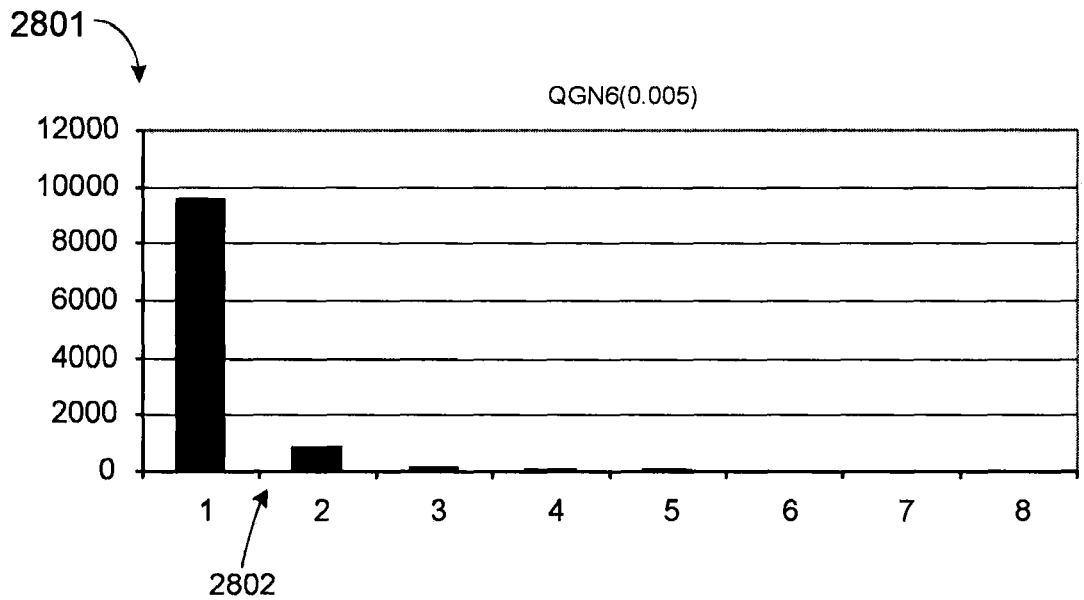

Implied orders (also referred to as implied markets) are reported in the market data because they entice traders to buy or sell the opposing side. As shown in FIG. 28, this effect is most pronounced when the implied order reduces the gap between the best bid and the best ask. FIG. 28 illustrates the observed relationship between the bid-ask gap and the likelihood of a trade. This graph shows the July 2006 e-miNY Natural Gas futures trading in their spot month on the NYMEX. The horizontal scale 2802 shows the spread in ticks and the vertical scale 2801 shows the number of lots traded. Reducing the gap from 2 ticks to 1 tick increases the volume by a factor of 10.

Figure 29:
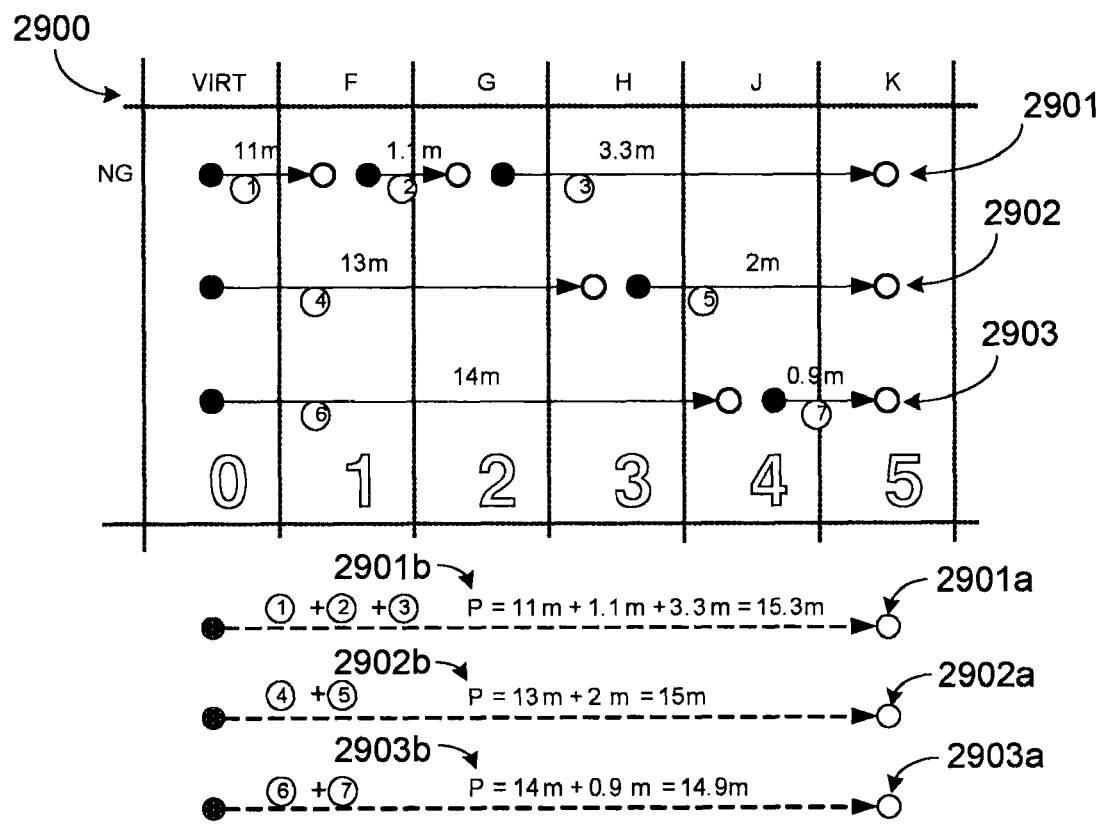
Figure 30:
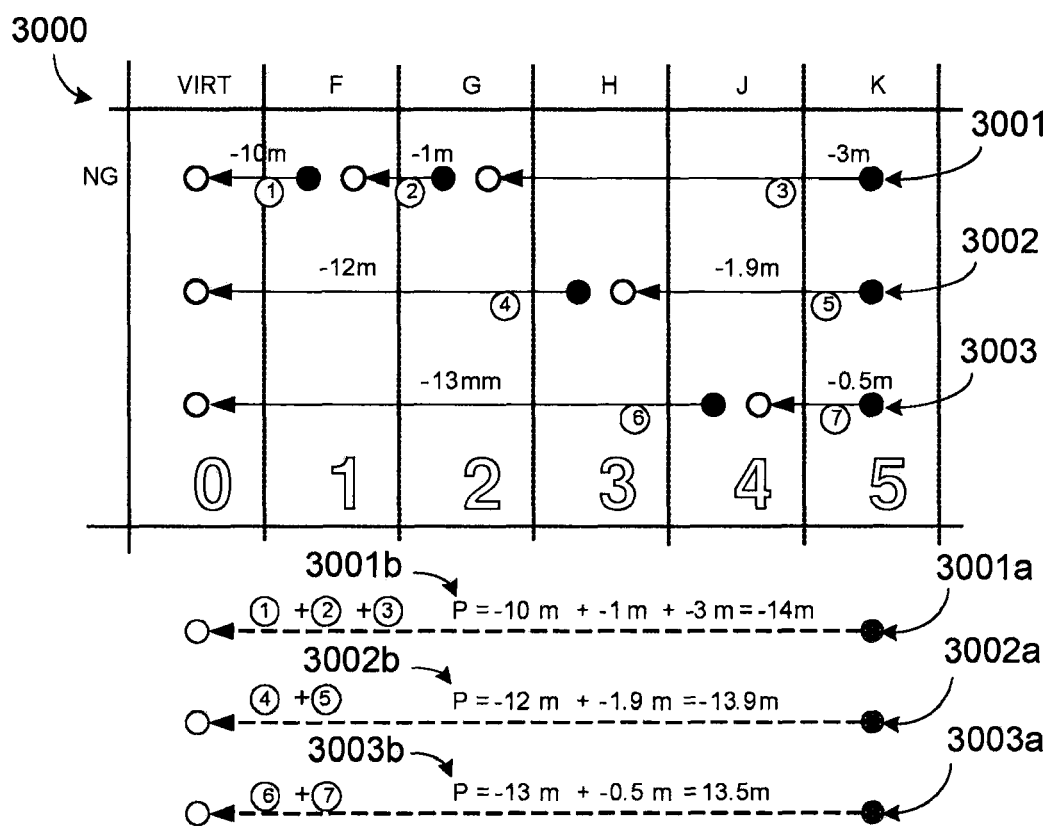

FIGS. 29 and 30 illustrate the creation of implied orders. A real order connects two grid elements. An implied order is formed by path of real orders connecting the same two endpoints. The selection of the best implied corresponds to finding the path with the lowest summed price.

FIG. 29 illustrates several combinations of sell orders for NG on grid 2900. The first combination 2901 consists of three orders (1, 2 and 3) and the second 2902 and third 2903 each consist of two orders (4 and 5, and 6 and 7, respectively). The best implied order is the combination of orders with the lowest machine price. The implieds that correspond to combinations 2901, 2902 and 2903 are shown as 2901a, 2902a and 2903a, respectively. The calculation used to determine the machine price for each order combination is shown at 2901b, 2902b and 2903b. As shown, the combination of orders 6 and 7 (2903) yields the lowest machine price (14.9m), and accordingly is the best implied order. If the orders are treated as edges and their machine prices as edge weights, then the combination of 6 and 7 forms the shortest path from node 0 to node 5.

FIG. 30 illustrates several combinations of buy orders for NG on grid 3000. The first combination 3001 consists of three orders (1, 2 and 3) whereas the second 3002 and third 3003 each consist of two orders (4 and 5, and 6 and 7, respectively). The best implied is the combination of orders with the lowest machine price. The implieds that correspond to combinations 3001, 3002 and 3003 are shown as 3001a, 3002a and 3003a, respectively. The calculation used to determine the machine price for each order combination is shown at 3001b, 3002b and 3003b. In this case combination 3001 (i.e., orders 1, 2 and 3) yields the lowest machine price, with a summed price of −14. The so-called "buy real sell virtual spread" corresponds to a buy order in the real future (NGK) so the machine price is multiplied by −1 to get an external price of $14.00.

Finding the path between two grid elements with the lowest summed prices is equivalent to finding the shortest path between nodes in a graph, a problem that can be solved using the techniques of graph theory.

Orders Trade in Price-Time Priority

If two or more resting orders have the same price, then price-time priority requires that the first order entered be the first to trade. In the case of implied orders, the time priority of the implied is determined by the most recently entered real order, i.e., the order that makes the implied possible.

Figure 31:
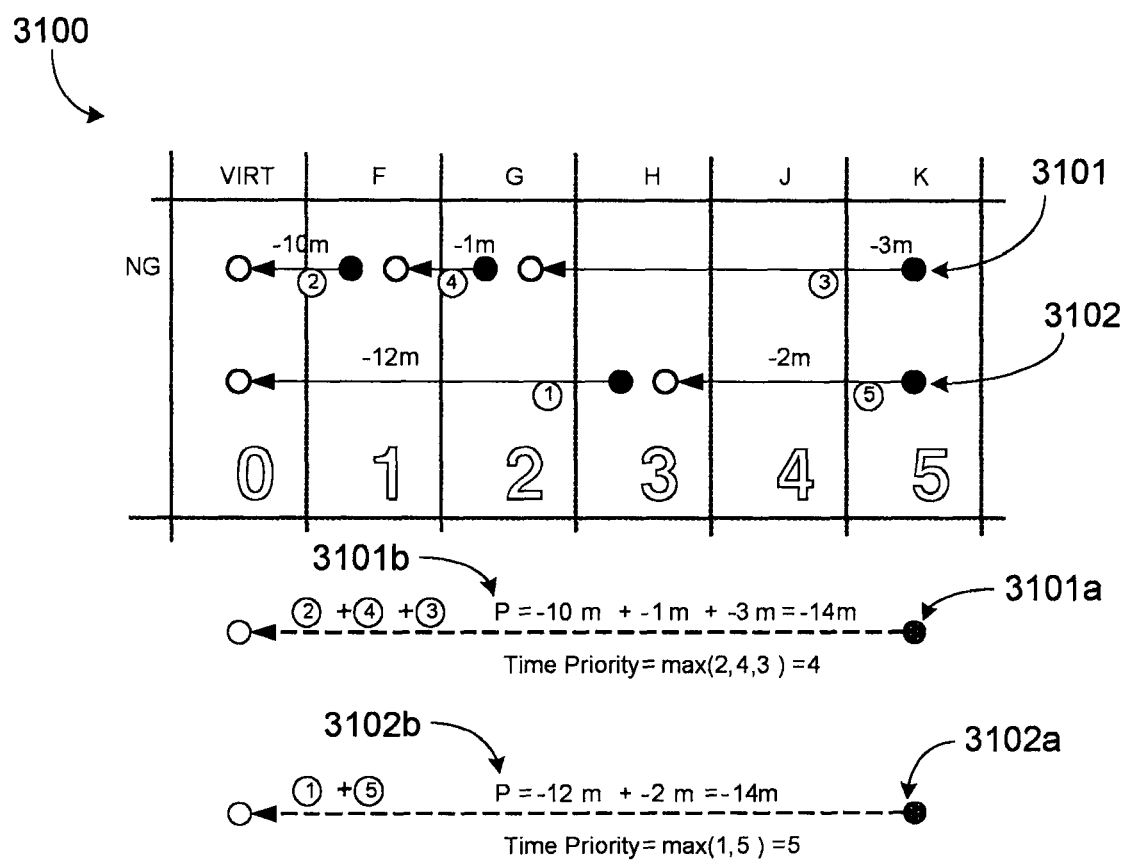

FIG. 31 illustrates an example of how this rule is applied. Two order combinations 3101 and 3102 are shown on the grid 3100. All of the orders are for NG. Order combination 3101 comprises orders 2, 4 and 3. Order combination 3102 comprises orders 1 and 5. In this example, the order numbers correspond to the sequence in which the orders were entered. Accordingly, order 1 was entered first and order 5 was entered last. The implied order corresponding to combinations 3101 and 3102 are shown at 3101a and 3102a, respectively. Price calculations 3101b and 3102b illustrate that combinations 3101 and 3102 have no best price between them.

However, the combination 3101 was created by order 4 and thus takes precedence over the combination 3102 created by order 5. The implied order created first has the lowest time priority and is the first to trade. The advantage of this rule from a business standpoint is that it preserves time priority within contracts. For example, if two real orders are entered in the same contract and result in parallel implied orders, the time priority rule for implieds will cause these to be traded in their sequence of entry. Time priority values can be compared in a similar manner to prices and the concept of a shortest path continues to apply.

An Implication Policy May Limit the Calculation of Implieds

An implication policy limits the calculation of implied orders to those combinations whose chain descriptors (or order patterns) appear in the policy. A policy may be used for several reasons, for example, (1) to prevent the automated test tool from calculating implieds that the match engine being tested does not calculate or (2) to model a reduction in the scope of implied calculations in response to an administrative message or timer event.

Figure 32:
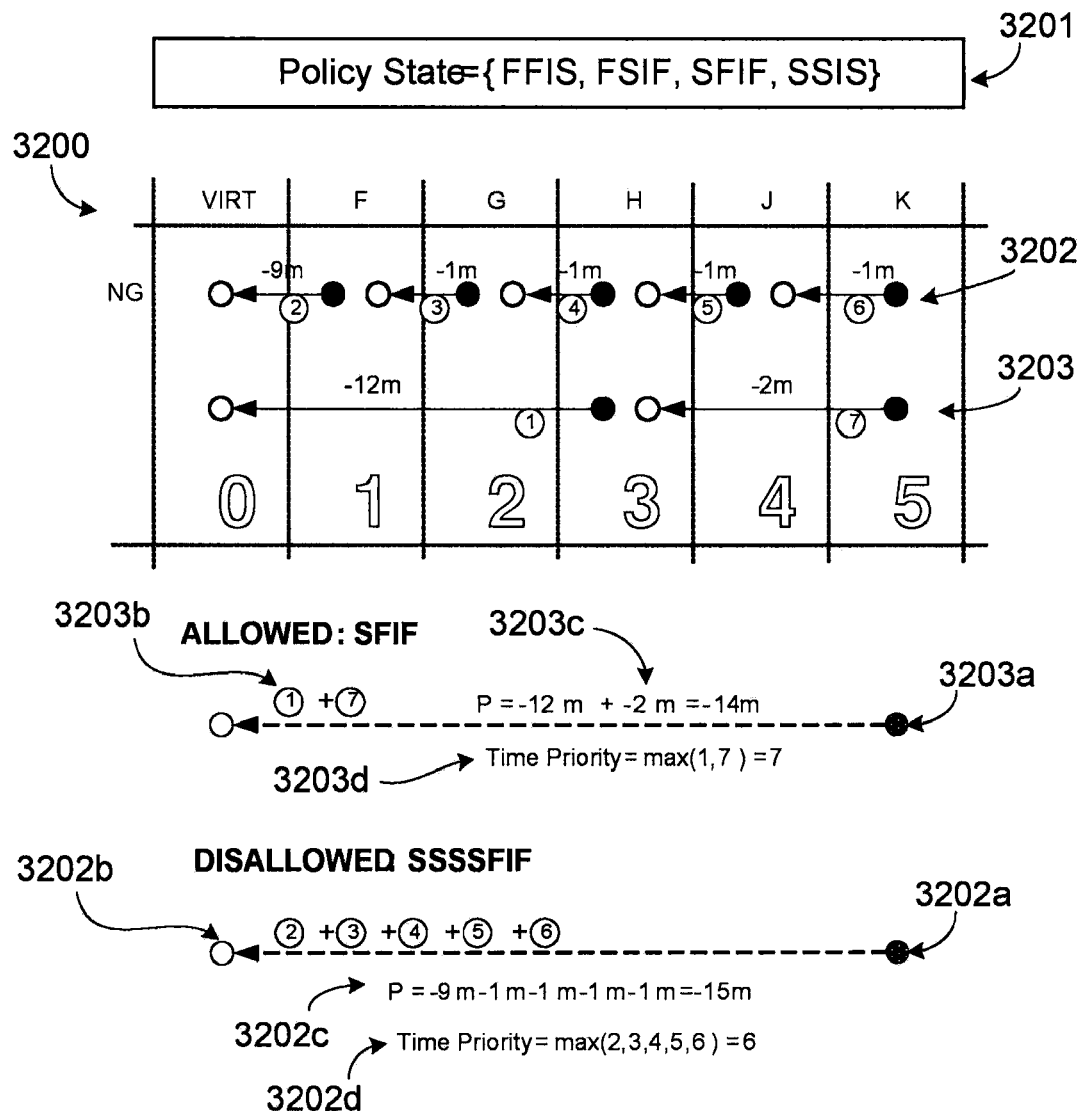

FIG. 32 shows the effect of a policy 3201, which allows only "first generation" implieds. Two combinations of orders 3202 and 3203 are shown on the grid 3200. All of the orders are for NG. Implied order 3203a corresponds to combination 3203 (i.e., orders 1 and 7, shown as decoration 3203b) and implied order 3202a corresponds to combination 3202 (i.e., orders 2 through 6, shown as decoration 3202b). The machine price of implied order 3203a, calculated at 3203c, is −14m. The machine price of implied order 3202a, calculated at 3202c, is lower than that of 3203a at −15m. Also, the time priority of order 3202a, calculated at 3202d, is greater than that of 3202a (calculated at 3203d). Nonetheless, the "first generation" policy 3201 rules out the longer chain 3202 even though it is lower in price and earlier in time.

Trade Price is Determined by the Resting Orders

The price of the trade is determined by the resting orders. This is illustrated in FIG. 26 for a trade set with two orders, i.e., an incoming real order trading with a resting real order. For larger trade sets, the general concept is illustrated in FIG. 19 for a trade set with four orders without price decoration.

Figure 33:
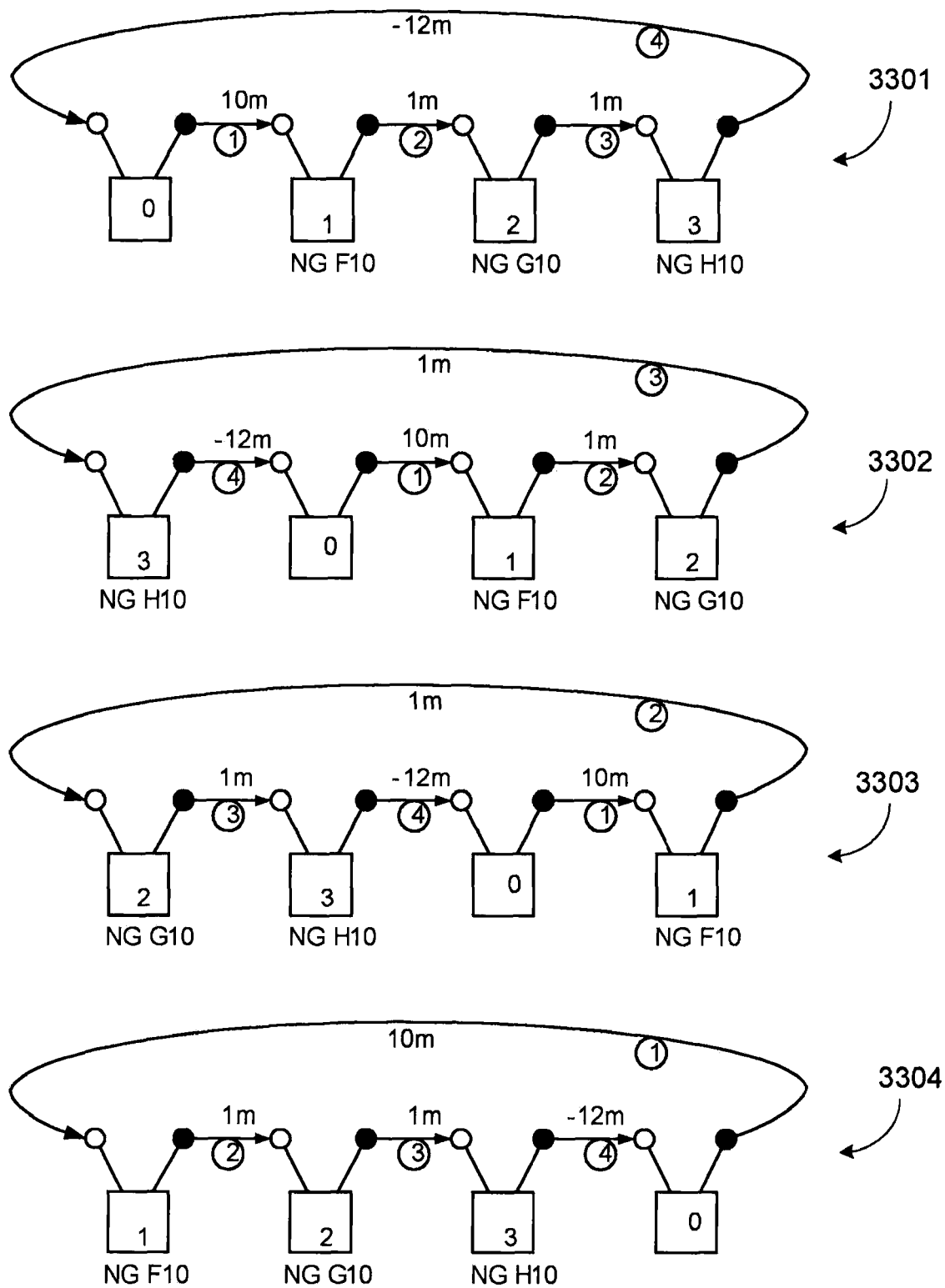

Once the trade set has been determined and the trade prices assigned, the orders form a cycle. The cycle can be rotated (i.e., the elements can be permuted cyclically) without affecting the order trade prices. Invariance under cyclic permutation is illustrated in FIG. 33. Each permutation 3301-3304 yields identical order trade prices.

Leg Prices for Spreads are Determined by the Latest Published Price

When spread orders are included in the trade set, the trade prices for the leg contracts must be computed in addition to the trade prices for the spread orders themselves.

Figure 34:
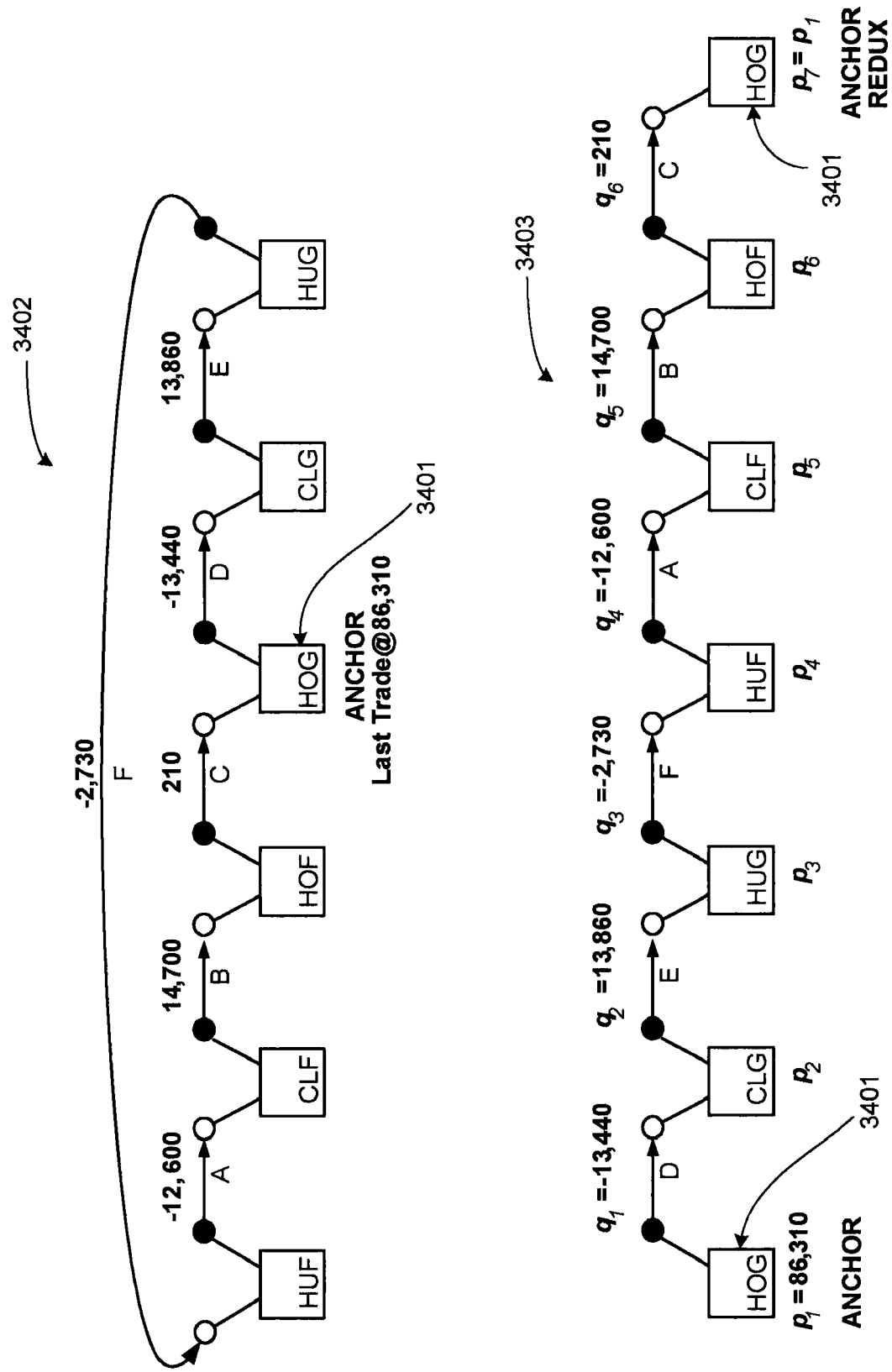

The inversion of buy order prices described in the semantic mapping makes it possible to compute leg prices by iterating forward along the arrows and adding the prices on the links that connect the node vees in the chain. The starting point of the iteration is either the virtual node (representing an outright price) or the node vee corresponding to the latest trade. This procedure is illustrated in FIG. 34.

In this example, the node for HOG (3401) serves as the anchor, and is thus the starting and ending point for the iteration 3403 of the chain 3402. The buy node of HOG corresponds to the latest trade, and thus is the starting point of the iteration 3403. The iteration 3403 therefore reorders the trades from A to E, alphabetically, to D, E, F, A, B, C.

In cases where the tick prices of the contracts in the chain and/or the legs are not identical, the leg prices computed through simple addition may not be exact multiples of the contract tick. If so, the leg price must be rounded to an on-tick price and each of the spread traders will experience a gain or loss. If rounding is limited to the on-tick prices one or two ticks upward or downward from the price obtained by simple addition, there will be a finite number of sets of on-tick leg prices for the trade cycle as a whole. The set of prices reported in the trades message is selected according to a ranking function. In some implementations, the ranking function is the sum of the squares of the trader gains and losses. The highest rank is given to the set with the lowest sum. In some implementations, the ranking function is the maximum trader loss. The highest rank is given to the set with the lowest value for the maximum loss.

Part II—Derivation of a Matching Algorithm for a New Order Type

An order is the trader's expression of intent to buy or sell an item that the trading system has designated as tradable. A trade takes place when a buy order is matched with a sell order. The trade is recorded by the trading system and the transfer of money or other items of value is subsequently handled according to rules accepted by the traders when they placed their orders.

A tradable item may be a composite item that incorporates two or more items which are bought and sold in the same transaction. For example, in some implementations an offer to buy a calendar spread is defined as an offer to buy the front month and sell the back month. In some implementations, an offer to sell a calendar spread is an offer to sell the front month and buy the back. In some cases, the buys and sells in a composite item are defined for the order to buy the composite (i.e., to take on the position). The order to sell the composite has these buys and sells reversed.

The MEML, in some implementations, is based on the concept of a trade set where the buys and sells in composite orders may be arranged in a cycle. Some ways of doing this include:

(1) The composite has only one real buy or sell and is expressed as a spread to or from a common virtual contract.

(2) The composite is inherently a spread (buy one item and sell another).

(3) The composite has all buys (or all sells). A virtual contract is defined and helper orders are used to connect the virtual contract to real contracts for implication. A rule is used in searching for paths to the effect that all the helper orders must be traversed before the path is complete.

(4) The composite has a single buy and multiple sells (or vice versa). A virtual contract is defined and helper orders are used to connect the virtual contract to real contracts for implication. A rule is used in searching for paths to the effect that all the helper orders must be traversed before the path is complete.

(5) The composite has an arbitrary number of buys and sells. Virtual contracts are defined and helper orders are added to transform the parallel execution of orders into the sequential execution of orders and helpers.

A real order is expressed as a direct connection between two nodes. An implied order is created by any combination of real orders that form a path between the same two nodes, subject to any implication policy that may be in effect. An incoming order matches the resting real or implied order if the sum of the prices is zero or negative.

Figure 35:
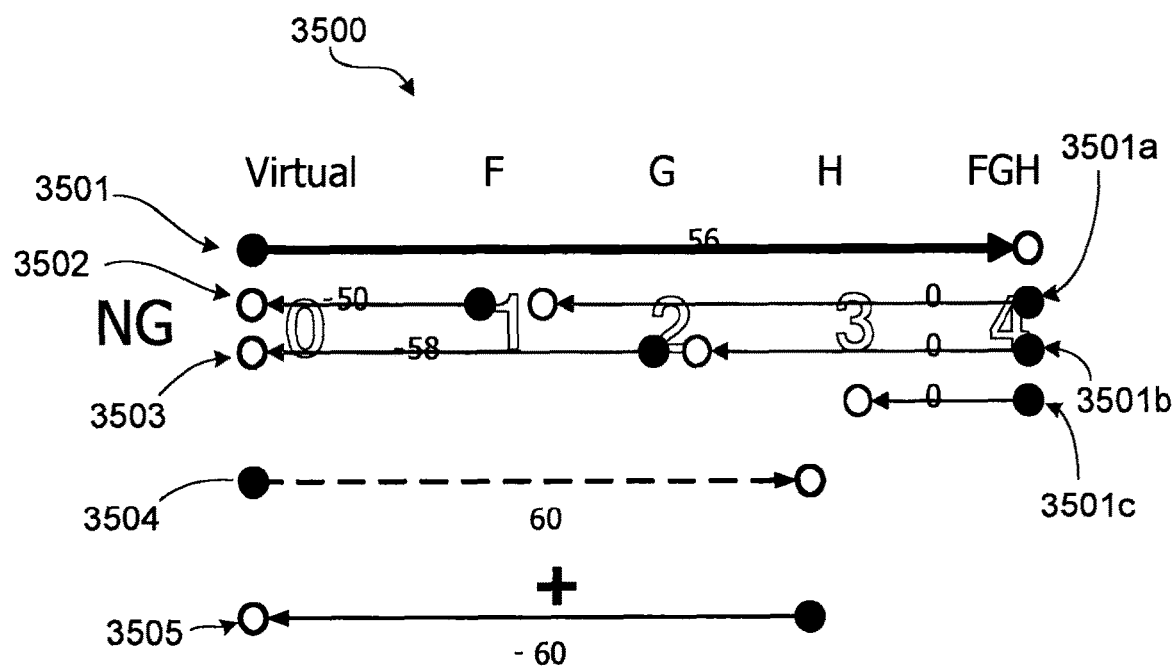
FIGS. 35-36 illustrate an implementation of derivation of a matching algorithm for a new order type.
Figure 36:
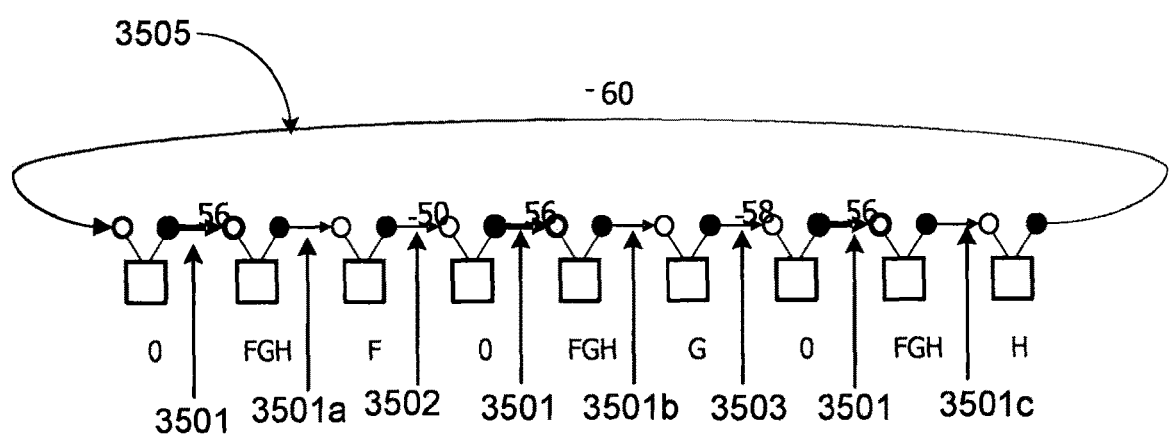

FIG. 35 illustrates a grid 3500 including a composite contract (a strip) and FIG. 36 illustrate the iteration of the grid. FIG. 35 illustrates an order 3501 to sell the January-February-March natural gas strip. The order 3501 comprises three helper orders 3501a-3501c that sell natural gas in each constituent month. There are two additional orders on the grid, 3502 and 3503, which buy natural gas in January and February, respectively. These orders imply a market 3504 to sell March natural gas. Accordingly, in grid 3500, when two outrights 3502 and 3503 are present, only one more outright order 3505 is required to complete a cycle.

The cycle is shown in FIG. 36. The rule for this type of order, in this implementation, requires that all the helpers 3501a-3501c be traversed. The strip order (3501), its helpers (3501a-3501c), the two resting outrights (3502 and 3503) and the matching outright (3505) are laid out in the form of a trade cycle. The primary order appears three times in the chain due to traversal of all three helpers. The implied price is obtained by summing the prices of the orders in the chain, i.e. 56+−50+56+−58=60 for the implied sell NGH (3504). This is matched by the incoming buy NGH order at −60 (3505).

Part III—Automated Test Tool

The Automated Test Tool executes a suite of tests defined in the modeling language and reports their pass/fail status. FIG. 2 indicates how this activity fits into a typical software development process in which a trade matching system is constructed.

In some implementations, the specification for the trade matching system consists of a set of MEML expressions referred to individually as scenarios. The scenarios are mapped to sequences of XML messages which are stored in files within the automated test system. The required outputs are calculated using reference code and stored in files within the automated test system. The automated test system transmits the messages to the trade matching system under test and compares the results with the stored references. An XSLT transformation or comparison program is used to limit the comparison to outputs that were specified in the model, i.e., from transitions between states in the factored state space that was chosen for modeling. The automated test system outputs a status report indicating whether or not the outputs from the system under test correspond to those required by the MEML expressions.

Figure 37:
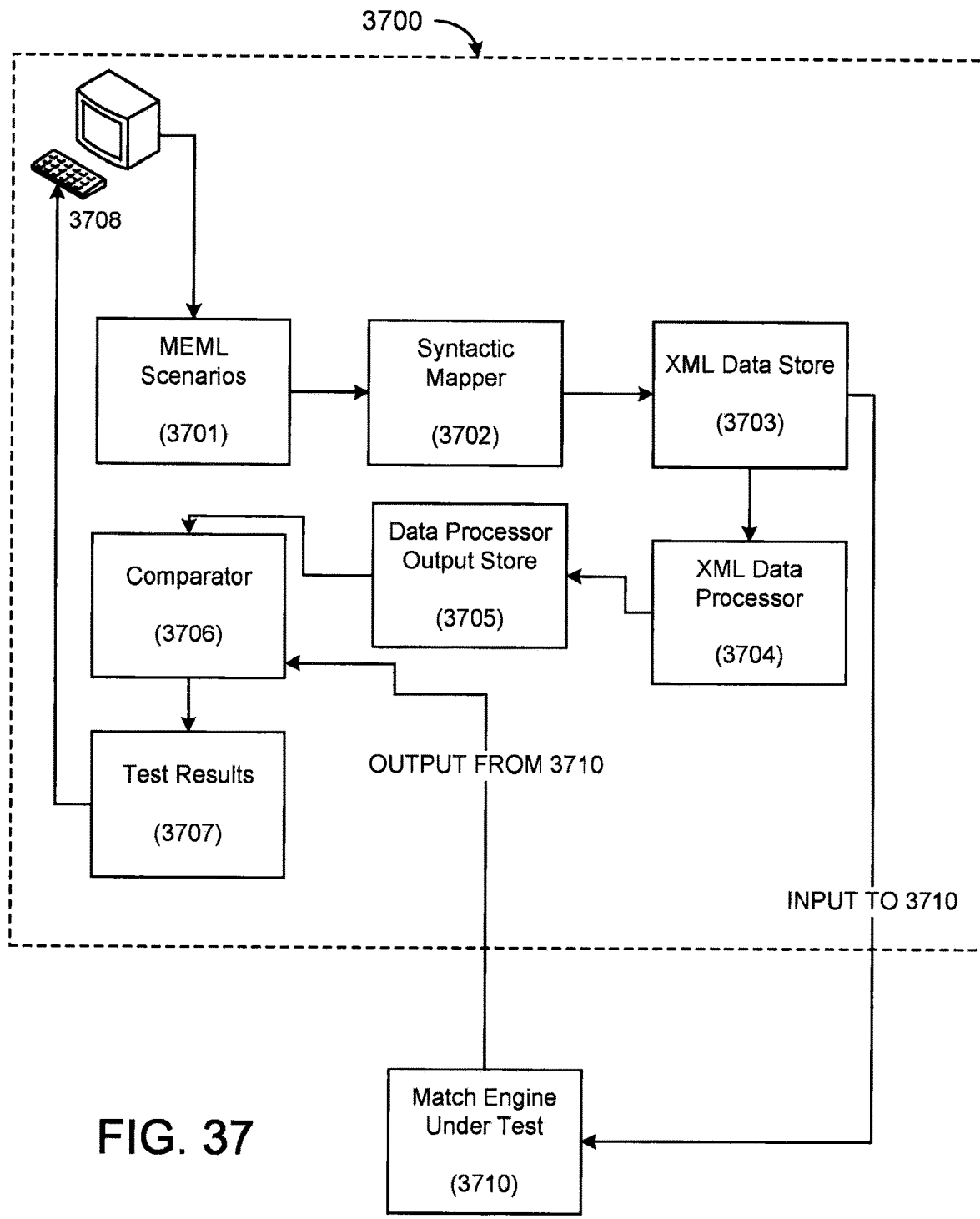
FIG. 37 illustrates an implementation of an automated test tool.

FIG. 37 illustrates an implementation of an automated test tool 3700. In this implementation, the test tool 3700 comprises a terminal 3708 and one or more processors associated with blocks 3701-3707. Depending on the implementation, the terminal 3708 may include one or more processors utilized for blocks 3701-3707, while in some implementations one or more dedicated processors are employed. Lines indicate communication between the elements. The communication can be by way of any means, including wired or wireless means.

A user at terminal 3708 enters scenarios in the MEML. To receive the scenarios in the MEML, the terminal can provide the user with a grid for entering trades (see, e.g., 8A, 8B, 8C, 14, 15 and 24 for exemplary screen shots of grids). The terminal 3708 is programmed or is coupled to programming that implements the MEML. The scenarios are stored in a MEML Scenarios data store 3701. A syntactic mapper 3702 converts the MEML scenarios into XML code. The syntactic mapper can be implemented by one or more processors that are informed by the syntactic mapping implemented for the particular MEML. The XML output from the mapper 3702 is stored in an XML data store 3703.

The XML data (either all or in part) is sent to two destinations. It is sent to an XML data processor 3704 for processing and determining the final state as a result of the MEML scenario(s) provided at the terminal 3708. It is also sent to a match engine that is being tested 3710. The match engine 3710 can be, for example, a match engine that is under development, a match engine that was recently updated, or a match engine that is being tested before deployment at an exchange. The match engine 3710 is capable of receiving the XML data from the XML data store 3703 and processing it to determine a final state.

The output from the XML data processor (e.g., the final state(s)) is stored in a data processor output store 3705. This data, along with the final state(s) from the match engine under test 3710, is transmitted to a comparator 3706. The comparator 3706 compares the final states determined by the XML data processor 3704 to those determined by the match engine under test 3710. If the results (3707) indicate that the XML data processor 3704 and the match engine under test 3710 produced consistent results, the match engine 3710 passes its test. However, a match engine 3710 may not be suitable for deployment on an exchange until some significant number of tests have been passed.

The test results 3707 are communicated to the terminal 3708 so that the user can take appropriate action. For example, a user may reprogram the match engine 3710, certify the match engine 3710 for deployment, or postpone deployment of the match engine due to inconsistencies with the XML data processor output.

Figure 38:
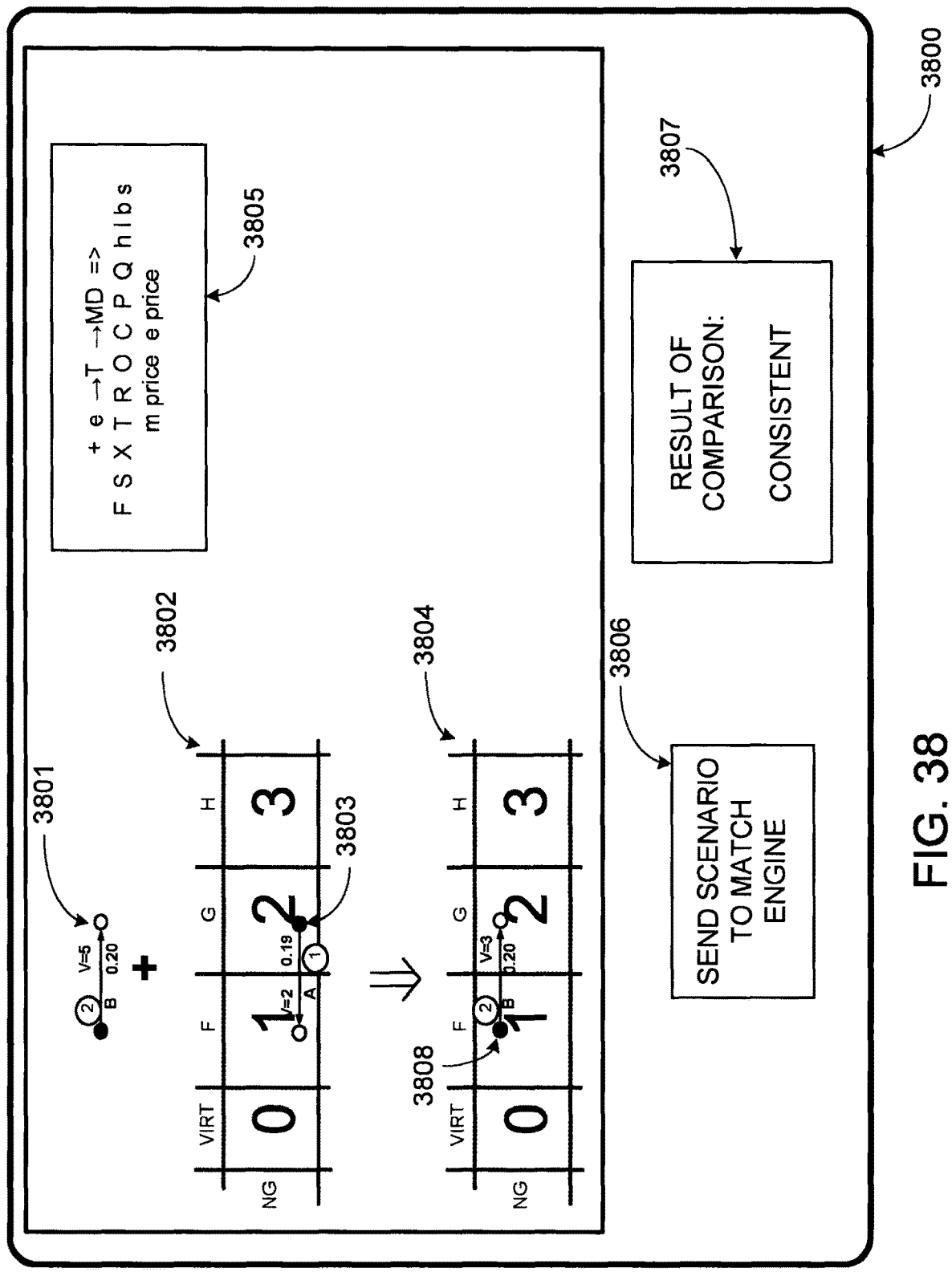
FIG. 38 illustrates an example screen shot in an implementation of an automated test tool.

FIG. 38 illustrates an example screen shot 3800 that, e.g., a user of terminal 3708 of FIG. 37 might encounter when interacting with an implementation of the automated test tool. In one portion of the screen 3800, a user can define an initial state of the market 3802 as well as an incoming order 3801. In this example, the initial state 3802 includes a spread 3803, against which the incoming order 3801 may trade. While this initial state 3802 is rather simple (to facilitate illustration), the initial state may be more complex and resemble, for example, FIG. 24. The user may use the commands on the screen (3805) to build initial states and incoming orders, and to instruct the test tool to calculate the final state 3804 (which comprises remaining order 3808). Once the test tool calculates the final state 3804 utilizing the MEML, the scenario (e.g., consisting of an XML transformation of the initial state 3802 and the incoming order 3801) may be sent to the match engine under test by actuating button 3806. The final state calculated using the MEML (3804) is then compared to the final state calculated by the match engine under test. The result is reported in window 3807.

Figure 39:
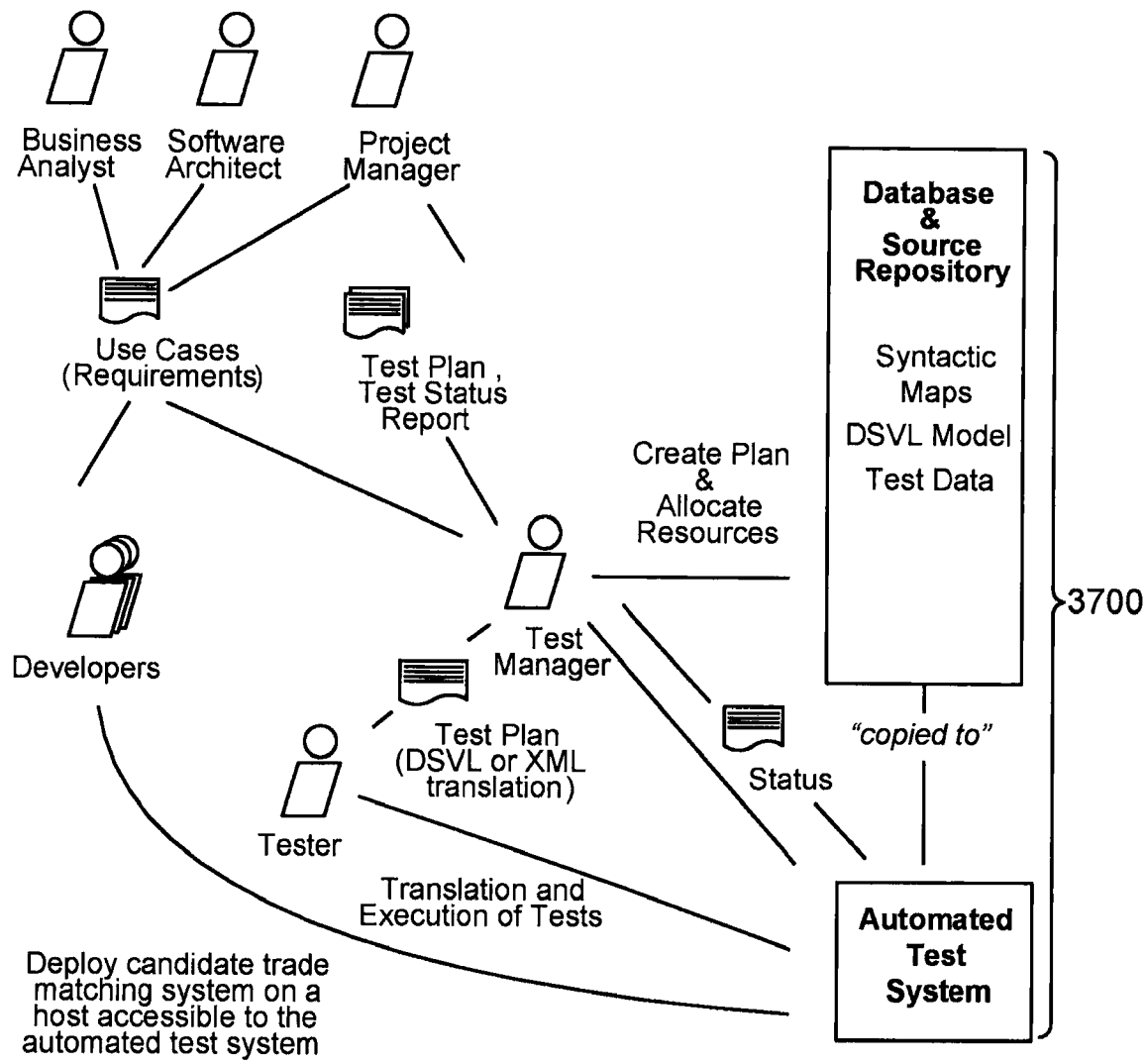
FIG. 39 illustrates an implementation of a business methodology associated with an automated test tool.

FIG. 39 illustrates an example business methodology that can be implemented with the automated test tool 3700. As shown, business analysts, software architects and project managers define use cases, which represent business requirements for a given match engine. Developers deploy the match engine defined by the requirements on the test system 3700. A test manager, based on the use cases, develops a test plan that is shared with one or more testers who use the test system 3700 to test the match engine. The status of the tests are reported back to the test manager, who informs the project manager of status.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

A number of embodiments of the invention have been described. Nevertheless, it will be understood that various modifications may be made without departing from the spirit and scope of the invention. Accordingly, other embodiments are within the scope of the following claims.

I claim:

1. A system for testing a match engine comprising:
   a terminal that includes at least one processor programmed to generate one or more testing scenarios using a match engine modeling language, each of the one or more testing scenarios comprising a set of match engine modeling language expressions, wherein the match engine modeling language comprises a concrete syntax including visual symbols, an abstract syntax defining how rules can be combined, and a syntactic mapping through which expressions in the match engine modeling language are associated with expressions in another programming syntax;
   a scenarios data store that stores the one or more testing scenarios generated by the terminal;
   a syntactic mapper coupled to the scenarios data store and that includes a processor programmed to convert the one or more testing scenarios from the match engine modeling language to a markup language;
   a markup language data store that stores the converted one or more testing scenarios converted by the syntactic mapper;
   a match engine that includes a processor programmed to receive at least one of the one or more converted testing scenarios from the markup language data store and determine a match engine state based thereon;

a markup language data processor programmed to receive the at least one of the one or more converted testing scenarios from the markup language data store and determine a data processor state based thereon; and a comparator that includes a processor programmed to compare the match engine state to the data processor state, wherein a matched result from the comparator corresponds to match engine operation passing the at least one of the one or more converted testing scenario.

2. The system of claim 1 wherein the comparator is programmed to generate test results and transmit the test results to the terminal.

3. The system of claim 1 wherein the match engine modeling language is a domain specific visual modeling language.

4. The system of claim 1 wherein the markup language is XML.

5. The system of claim 1, wherein the syntactic mapper and comparator are implemented with the same processor.

6. The system of claim 1, wherein the syntactic mapper, comparator and a markup language data processor are implemented with the same processor.

7. The system of claim 1, wherein the processor of the terminal is programmed to generate a grid for entering trades using the match engine modeling language.

* * * * *